(12) United States Patent
Murakami et al.

(10) Patent No.: US 9,041,807 B2
(45) Date of Patent: May 26, 2015

(54) IMAGE PROCESSING DEVICE AND IMAGE PROCESSING METHOD

(75) Inventors: Masahiko Murakami, Kobe (JP); Nobunori Asayama, Kobe (JP)

(73) Assignees: FUJITSU TEN LIMITED, Kobe (JP); FUJITSU LIMITED, Kawasaki (JP)

( * ) Notice: Subject to any disclaimer, the term of this patent is extended or adjusted under 35 U.S.C. 154(b) by 392 days.

(21) Appl. No.: 13/575,408

(22) PCT Filed: Jan. 27, 2011

(86) PCT No.: PCT/JP2011/051546
§ 371 (c)(1),
(2), (4) Date: Jul. 26, 2012

(87) PCT Pub. No.: WO2011/093354
PCT Pub. Date: Aug. 4, 2011

(65) Prior Publication Data
US 2012/0293660 A1 Nov. 22, 2012

(30) Foreign Application Priority Data

Jan. 29, 2010 (JP) ................................. 2010-017615
Jan. 29, 2010 (JP) ................................. 2010-019060

(51) Int. Cl.
*H04N 7/18* (2006.01)
*G06K 9/00* (2006.01)
*B60R 1/00* (2006.01)

(52) U.S. Cl.
CPC .............. *G06K 9/00812* (2013.01); *B60R 1/00* (2013.01); *B60R 2300/30* (2013.01)

(58) Field of Classification Search
USPC ........... 348/148, 187, 143, 47, 48, 53, 68, 73, 348/74, 118, 120, 131, 132, 139, 153, 159, 348/174, 70, 207.99, 208.99, 222.1, 234, 348/236, 238, 262, 333.04, 333.12, 370, 348/396.1, 584, 719, 785, 831, 837; 382/104, 284, 103, 285; 340/901, 435, 340/995.17, 933, 426.23; 345/214
See application file for complete search history.

(56) References Cited

U.S. PATENT DOCUMENTS 5,759,044 A * 6/1998 Redmond ................. 434/307 R
7,266,219 B2 * 9/2007 Okamoto et al. ............. 382/104
(Continued)

FOREIGN PATENT DOCUMENTS

JP   A-11-136571    5/1999
JP   A-2002-296635  10/2002
(Continued)

OTHER PUBLICATIONS

Sep. 18, 2012 International Preliminary Report on Patentability issued in International Application No. PCT/JP2011/051546.
(Continued)

*Primary Examiner* — Jeffery Harold
*Assistant Examiner* — Mustafizur Rahman
(74) *Attorney, Agent, or Firm* — Oliff PLC

(57) ABSTRACT

An image processing device configured to be installed in a vehicle includes an image acquirer, an image selector, a first luminance adjuster, a synthetic image generator, and an image provider. The image acquirer acquires camera images captured by cameras provided on the vehicle. The image selector selects one of the camera images as a representative image based on luminances of the camera images. The first luminance adjuster adjusts a luminance of at least one of the other camera images based on a luminance of the representative image. The synthetic image generator generates a synthetic image showing a periphery of the vehicle, based on the representative image and the other camera images the luminance of at least one of which has been adjusted by the first adjuster. The image provider outputs, to a display device installed in the vehicle, information corresponding to the synthetic image.

10 Claims, 24 Drawing Sheets

(56) References Cited

U.S. PATENT DOCUMENTS

| | | |
|---|---|---|
| 8,018,490 B2 * | 9/2011 | Yuasa et al. .................... 348/148 |
| 8,170,286 B2 * | 5/2012 | Kashimura et al. ........... 382/104 |
| 2002/0196340 A1 | 12/2002 | Kato et al. |
| 2003/0021490 A1 * | 1/2003 | Okamoto et al. ............. 382/284 |
| 2004/0085447 A1 * | 5/2004 | Katta et al. ................... 348/143 |
| 2007/0165108 A1 * | 7/2007 | Yuasa et al. .................... 348/148 |
| 2008/0036866 A1 * | 2/2008 | Sogawa et al. ................ 348/187 |
| 2008/0151054 A1 * | 6/2008 | Kubota et al. ................. 348/148 |
| 2008/0205705 A1 * | 8/2008 | Kashimura et al. ........... 382/104 |
| 2009/0058845 A1 * | 3/2009 | Fukuda et al. ................ 345/214 |
| 2009/0079553 A1 * | 3/2009 | Yanagi et al. ................. 340/435 |
| 2009/0079585 A1 * | 3/2009 | Chinomi et al. .............. 340/901 |
| 2009/0240432 A1 * | 9/2009 | Osanai ........................ 701/300 |
| 2009/0296987 A1 * | 12/2009 | Kageyama et al. ........... 382/103 |
| 2009/0322878 A1 * | 12/2009 | Ishii ............................... 348/148 |
| 2010/0302370 A1 * | 12/2010 | Sogawa et al. ................ 348/148 |
| 2012/0293659 A1 * | 11/2012 | Bandou ......................... 348/148 |

FOREIGN PATENT DOCUMENTS

| | | |
|---|---|---|
| JP | A-2002-324235 | 11/2002 |
| JP | A-2004-120203 | 4/2004 |
| JP | A-2005-117635 | 4/2005 |
| JP | A-2008-028521 | 2/2008 |
| JP | A-2009-141490 | 6/2009 |

OTHER PUBLICATIONS

Oct. 15, 2013 Office Action issued in Japanese Patent Application No. 2010-017615 (with translation).

Apr. 26, 2011 International Search Report issued in International Application No. PCT/JP2011/051546 (with translation).

* cited by examiner

IMAGE PROCESSING DEVICE AND IMAGE PROCESSING METHOD

TECHNICAL FIELD

The present invention relates to a technology to adjust the luminance of a plurality of camera images that are synthesized.

BACKGROUND ART

A technology to process an image input from a camera and display the processed image on a display screen is known. For example, there is a camera image processing called AGC (Automatic Gain Control).

In general, AGC refers to the control that makes an image displayed on a display screen not too dark and not too bright, through an electrical circuit or the like, by performing a process of increasing the entire brightness if an average brightness of an image signal input from a camera is weak, while performing a process of decreasing the entire brightness if the average brightness of the image signal is strong. Such a camera image processing technology is disclosed, for example, in Japanese Unexamined Patent Application Publication No. 11-136571 (Patent Document 1).

Specifically, with respect to luminance devoted to all pixels in an image, correction is performed in a manner that if the luminance is low relative to the average luminance, the luminance is heightened by a prescribed % depending on the low luminance level, while if the luminance is high relative to the average luminance, the luminance is lowered by a prescribed % depending on the high luminance level (hereinafter referred to as "average luminance correction").

As described above, by performing the average luminance correction with respect to the image, too dark part becomes brighter and too bright part becomes darker relative to the average luminance, so that the entire image can give the impression of calm to a user, and as a result, the user can easily view the image.

On the other hand, if the average luminance correction is simply performed in a state where a part of the image is extremely bright relative to other parts, it becomes difficult for the user to see the image.

For example, if light of headlights of a vehicle that travels the opposite lane is contained in a part of a vehicle surrounding image captured by a camera mounted on an outside of the vehicle, the average luminance of the image is calculated to be considerably higher as compared with a case where the light of the headlights is not contained in the image. If the average luminance correction is performed based on the high average luminance, the luminance of the entire image calms down to darken the entire image. Further, the originally dark part is not brightened, and thus it becomes difficult for the user to see the image.

Accordingly, if the luminance devoted to the pixels in the image exceeds a threshold value in the case of calculating the average luminance, the luminance is excluded from the calculation of the average luminance. That is, by performing the average luminance correction through calculation of the average luminance except for the excluded luminance, the problem can be solved that due to the influence of the high luminance in the part of the image, the image after correction becomes dark entirely, and the originally dark part is not brightened. Such a technique is disclosed, for example, in Japanese Unexamined Patent Application Publication No. 2004-120203 (Patent Document 2).

However, since a vehicle is put into various situations, the luminance distribution in the image that is successively captured by cameras mounted on a vehicle varies variously, and even if the average luminance is calculated with respect to the image using a constant threshold value, the optimum average luminance correction may not be performed. For example, the luminance of the extremely bright part of the image that is obtained in nighttime corresponds to the proper brightness in the image obtained in the daytime. Because of this, in the case of using the constant threshold value, an appropriate correction may not be performed with respect to the daytime or nighttime image.

Further, recently, a vehicle surrounding image display system has been developed which generates one sheet of vehicle surrounding image that shows the state of the vehicle surroundings through synthesis of images input from a plurality of cameras mounted on a vehicle and displays the generated vehicle surrounding image on a display screen.

SUMMARY OF INVENTION

Problems to be Solved by Invention

However, in the vehicle surrounding image display system, if one sheet of synthetic image is generated after AGC is performed with respect to every one of the plurality of camera images, brightness unevenness may occur in the synthetic image. Further, if the AGC is performed after the plurality of camera images are synthesized into one sheet of vehicle surrounding image, the image having the highest luminance becomes further brighter due to the influence of the darkest image, and thus it may become difficult to see the corresponding image.

Accordingly, it is a first object of the present invention to provide a technology that makes it possible to easily see a synthetic image of a plurality of camera images captured by a plurality of cameras mounted on a vehicle.

Further, it is a second object of the present invention to provide a technology that can perform optimum luminance correction with respect to images captured by cameras mounted on a vehicle.

Means for Solving Problems

In order to achieve the first object, according to the present invention, those listed below may be provided.

(1) An image processing device configured to be installed in a vehicle, including: an image acquirer configured to acquire camera images captured by cameras provided on the vehicle; an image selector configured to select one of the camera images as a representative image based on luminances of the camera images; a first luminance adjuster configured to adjust a luminance of at least one of the other camera images based on a luminance of the representative image; a synthetic image generator configured to generate a synthetic image showing a periphery of the vehicle, based on the representative image and the other camera images the luminance of at least one of which has been adjusted by the first adjuster; and an image provider configured to output, to a display device installed in the vehicle, information corresponding to the synthetic image.

(2) The image processing device as described in (1), wherein: the image selector is configured to calculate, for each of the camera images, an average value of luminances of respective pixels constituting each of the camera images, and to select one of the camera images having a highest average value as the representative images.

(3) The image processing device as described in (2), wherein: the image selector is configured to exclude the pixels having a luminance no less than a prescribed value when the average value is calculated.

(4) The image processing device as described in (2), further including a controller configured to activate the first luminance adjuster when a difference between the highest average value and a lowest average value which are calculated by the image selector is no less than a prescribed value.

(5) The image processing device as described in (4), further including: a second luminance adjuster configured to adjust a luminance of each of the camera images based on the average value thereof calculated by the image selector, wherein the controller is configured to activate the second luminance adjuster when the difference is less than the prescribed value.

(6) An image processing method including: acquiring camera images captured by cameras provided on the vehicle; selecting one of the camera images as a representative image based on luminances of the camera images; adjusting a luminance of at least one of the other camera images based on a luminance of the representative image; generating a synthetic image showing a periphery of the vehicle, based on the representative image and the other camera images the luminance of at least one of which has been adjusted; and outputting, to a display device installed in the vehicle, information corresponding to the synthetic image.

In order to achieve the second object, according to the present invention, those listed below may be provided.

(7) An image processing device configured to be installed in a vehicle, including: an image acquirer configured to acquire a camera image captured by a camera provided on the vehicle; a first average calculator configured to divide the camera image into a plurality of regions each of which includes a plurality of pixels, and to calculate, for each of the regions, an average value of luminances of the respective pixels as a first average value; a region selector configured to select at least one of the regions in which the first average value is no greater than a threshold value; a luminance adjuster configured to adjust an entire luminance of the camera image based on the luminance of the at least one of the regions selected by the region selector; an image provider configured to output, to a display device installed in the vehicle, information corresponding to the camera image the entire luminance of which has been adjusted by the luminance adjuster; a second average calculator configured to calculate an average value of luminances of the pixels included in the at least one of the regions selected by the region selector, as a second average value; and a threshold updater configured to update the threshold value based on the second average value.

(8) The image processing device as described in (7), wherein: the luminance adjuster is configured to adjust the entire luminance of the camera image based on the second average value.

(9) The image processing device as described in (7), wherein: the luminance adjuster is configured to adjust the entire luminance of the camera image based on a highest value of the luminances of the pixels included in the at least one of the regions selected by the region selector.

(10) The image processing device as described in any one of (7) to (9), wherein: the image acquirer is configured to acquire camera images captured by cameras provided on the vehicle; the first average calculator is configured to calculate the first average value for each of the camera images; the region selector is configured to select the at least one of the regions for each of the camera images; the luminance adjuster is configured to adjust the entire luminance for each of the camera images; and the image processing device further includes a synthetic image generator configured to generate a synthetic image showing a periphery of the vehicle based on the camera images the entire luminances of which have been adjusted by the luminance adjuster; and the image provider is configured to output information corresponding to the synthetic image to the display device.

(11) An image processing method including: acquiring a camera image captured by a camera provided on the vehicle; dividing the camera image into a plurality of regions each of which includes a plurality of pixels; calculating, for each of the regions, an average value of luminances of the respective pixels as a first average value; selecting at least one of the regions in which the first average value is no greater than a threshold value; adjusting an entire luminance of the camera image based on the luminance of the at least one of the regions selected by the region selector; outputting, to a display device installed in the vehicle, information corresponding to the camera image the entire luminance of which has been adjusted; calculating an average value of luminances of pixels included in the at least one of the regions selected by the region selector; and updating the threshold value based on the second average value.

Advantageous Effects of Invention

According to the configuration described in (1) to (6), the generated synthetic image has less luminance unevenness, and thus it is possible to prevent the user from having discomfort.

According to the configuration described in (2), since other camera images are adjusted based on the ideal camera image having the highest average luminance, the visibility for the user can be improved.

According to the configuration described in (3), since the highest average luminance is prevented from being extremely heightened, the visibility for the user can be improved.

According to the configuration described in (4), in the case where the bright image and the dark image coexist, the adjustment is made based on the bright image, and thus the dark image can be brightened.

According to the configuration described in (5), in the case where the bright image and the dark image coexist, the luminance can be adjusted based on the average luminance for each camera image, and thus image degradation can be prevented.

According to the configuration described in (7) to (11), an image with various luminance distribution variations, which is captured by a camera mounted on a vehicle that is put into various situations, can be optically adjusted.

According to the configuration described in (8), if there are many parts having high luminance and low luminance in the camera image, the luminance of the entire image is stabilized on the basis of the second average value, and the phenomenon, in which the image becomes entirely dark and the originally dark part is not brightened due to the influence of the part having extremely high luminance, is prevented from occurring.

According to the configuration described in (9), if there are many parts having high luminance in the camera image, the luminance of the entire image is stabilized on the basis of the maximum luminance, and the picture quality of the part having high luminance is prevented from deteriorating. Further, the phenomenon, in which the image becomes entirely dark and the originally dark part is not brightened due to the influence of the part having extremely high luminance, is prevented from occurring.

MODE TO CARRY OUT INVENTION

Hereinafter, a vehicle surrounding image display system according to the preferred embodiments of the present invention will be described in detail with reference to the accompanying drawings.

<First Embodiment>

[Vehicle]

Figure 1:
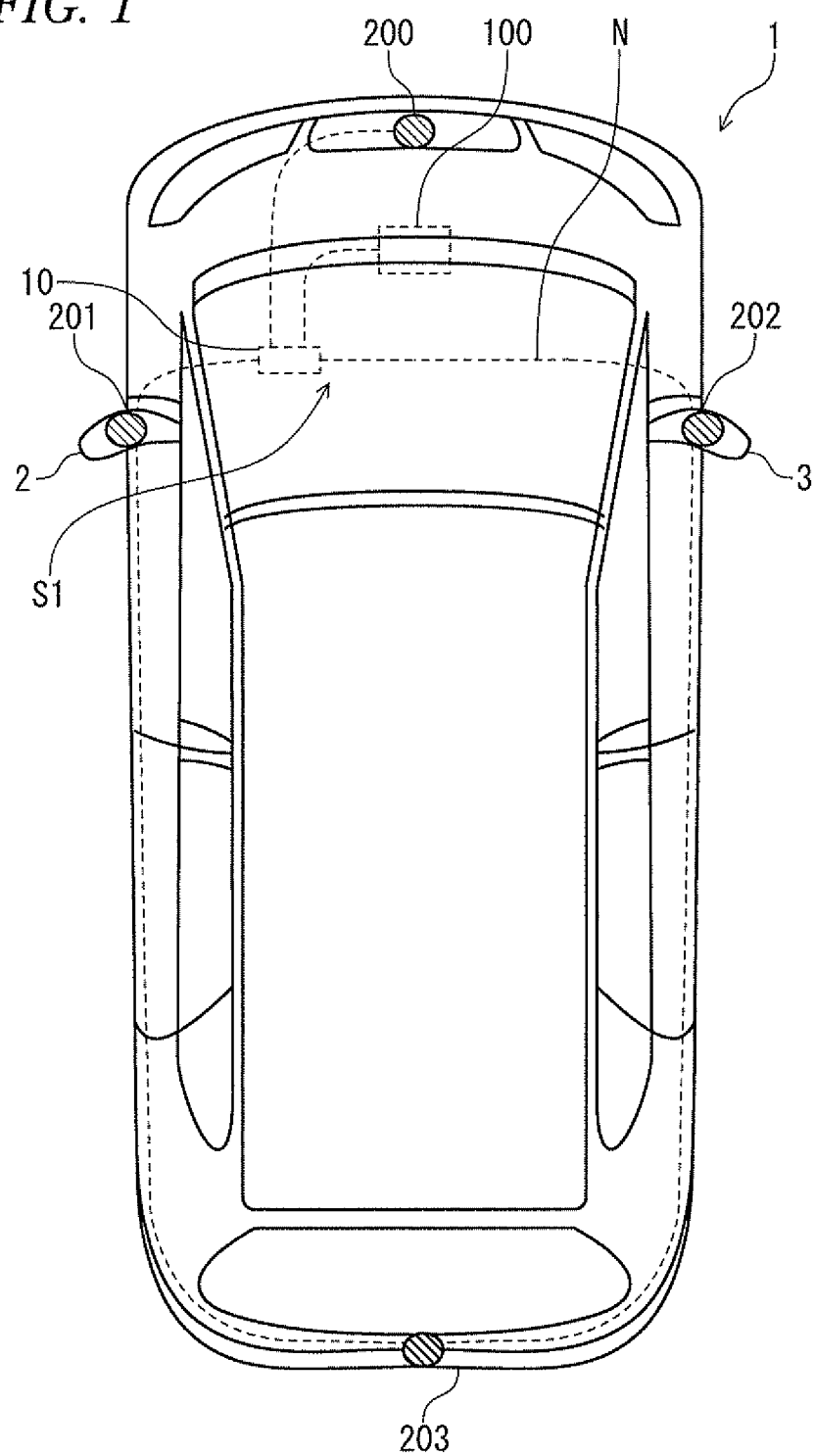
FIG. 1 is a view illustrating a vehicle on which a vehicle surrounding image display system according to the present invention is mounted.

First, a vehicle surrounding image display system mounted on a vehicle in which an engine or a traveling electric motor, which is a driving source, is installed will be described on the basis of FIG. 1.

A vehicle surrounding image display system S1 includes an image processing system S2, an in-vehicle device 100, various kinds of switches and sensors, which are electrically connected to an in-vehicle network N.

The image processing system S2 includes a control device 10, a first capturing unit 200, a second capturing unit 201, a third capturing unit 202, and a fourth capturing unit 203, which constitute a capturing system S3.

The control device 10 is installed below a passenger seat of a vehicle 1. The in-vehicle device 100 is installed between a driver seat and the passenger seat in a dashboard of the vehicle 1. The first capturing unit 200 is installed in a front portion of the vehicle 1, the second capturing unit 201 is installed in a left side mirror 2 of the vehicle 1, the third capturing unit 202 is installed in a right side mirror 3 of the vehicle, and the fourth capturing unit 203 is installed in the rear portion of the vehicle 1. The various kinds of switches and sensors are arranged on appropriate positions to achieve their purposes. The in-vehicle network N is arranged inside a body of the vehicle such as an engine room or pillar of the vehicle 1.

(Vehicle Surrounding Image Display System)

Figure 2:
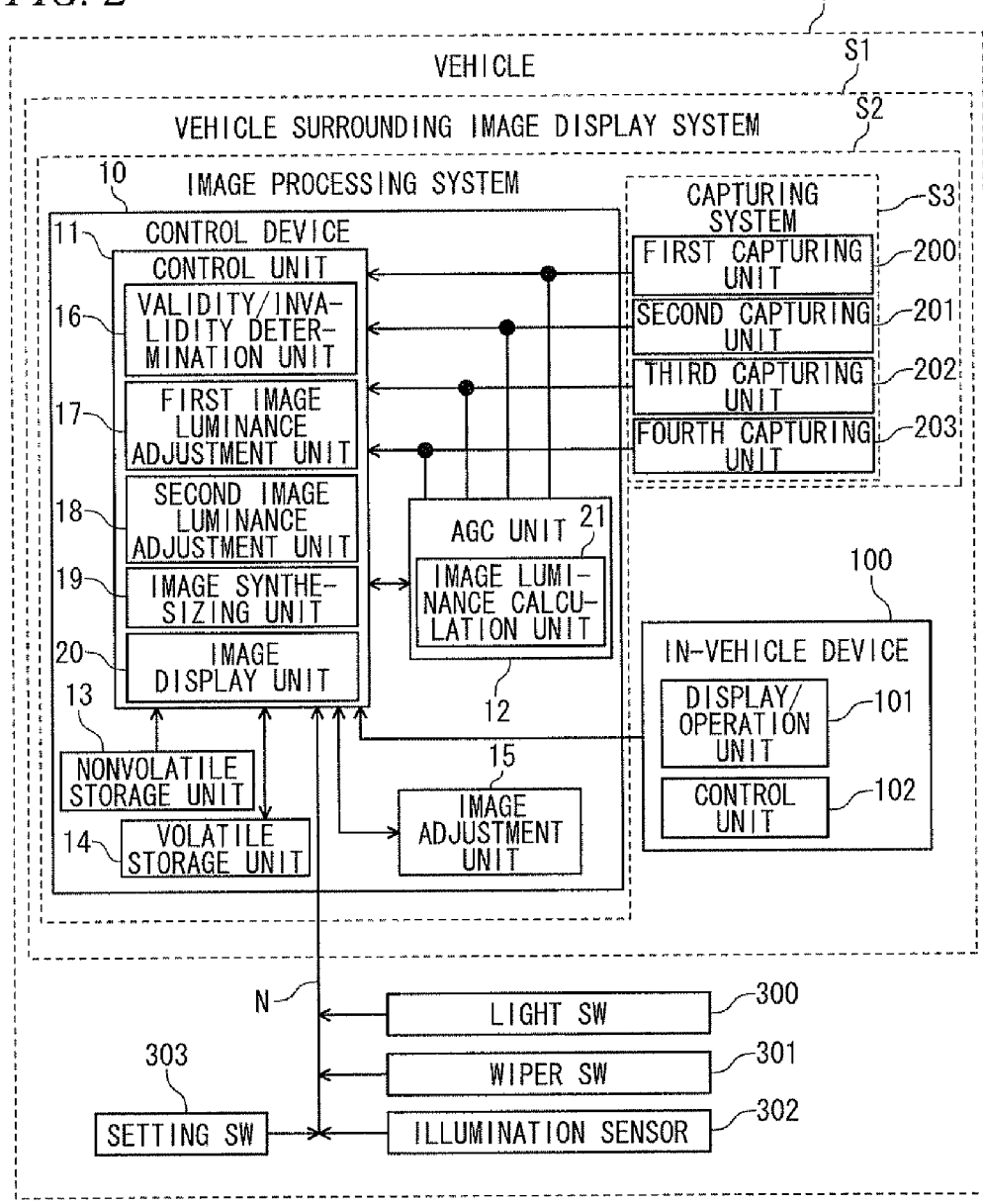
FIG. 2 is a system block diagram of a vehicle surrounding image display system according to a first embodiment of the present invention.

As shown in FIG. 2, the vehicle surrounding image display system S1 includes the image processing system S2 and the in-vehicle device 100.

(Image Processing System)

As shown in FIG. 2, the image processing system S2 includes the control device 10 and the capturing system S3.

(Capturing System)

As shown in FIG. 2, the capturing system S3 includes the first capturing unit 200, the second capturing unit 201, the third capturing unit 202, and the fourth capturing unit 203.

The first capturing unit 200 is a front camera that is an in-vehicle camera, and the second capturing unit 201 is a left side camera that is an in-vehicle camera. The third capturing unit 202 is a right side camera that is an in-vehicle camera, and the fourth capturing unit 203 is a back camera that is an in-vehicle camera. These capturing units are provided with imaging elements such as CCD or CMOS, and electronically acquire images.

The first capturing unit 200 is provided in the vicinity of a license plate mounting position that is at the front end of the vehicle 1, and its optical axis is directed in the straight direction of the vehicle 1. The second capturing unit 201 is provided in the left side mirror 2, and its optical axis is directed outward along the left direction based on the straight direction of the vehicle 1. The third capturing unit 202 is provided in the right side mirror 3, and its optical axis is directed outward along the right direction based on the straight direction of the vehicle 1. The fourth capturing unit 203 is provided in the vicinity of the license plate mounting position that is at the rear end of the vehicle, and its optical axis is directed in the reverse direction to the straight direction of the vehicle 1. On the other hand, the mounting positions of the first capturing unit 200 and the fourth capturing unit 203, although it is preferable that the mounting positions thereof are substantially the center of left and right sides, may be somewhat shifted in the left and right directions from the center of the left and right sides.

Fish-eye lenses are adopted as lenses of the first to fourth capturing units 200 to 203, and the first to fourth capturing units 200 to 203 have an angle of view of more than 180 degrees. Because of this, using the four capturing units, it is possible to image the whole periphery of the vehicle 1.

(Control Device)

The control device 10 corresponds to the image processing device according to the present invention, and as shown in FIG. 2, includes a control unit 11, an AGC unit 12, a nonvolatile storage unit 13, a volatile storage unit 14, and an image adjustment unit 15.

The control unit 11 includes a setting selection unit 16, a first image luminance adjustment unit 17, a second image luminance adjustment unit 18, an image synthesizing unit 19, and an image display unit 20. That is, the control unit 11 performs a setting selection function, a first image luminance adjustment function, a second image luminance adjustment function, an image synthesizing function, and an image display function.

Specifically, the control unit 11 is configured as a computer having a CPU, a RAM, a ROM, and the like, and the CPU executes a program for performing the functions stored in the ROM using the RAM that serves as a working area.

The AGC unit 12 includes an image luminance calculation unit 21. That is, the AGC unit 12 performs an image luminance calculation function to be described later.

Specifically, the AGC unit 12 includes an electronic circuit and the like. An image captured by the capturing system S3 is input to the electronic circuit or the like, and the electronic circuit or the like performs the function based on the input image.

The nonvolatile storage unit 13 includes an EEPROM, which serves as a backup memory for storing parameters when the control unit 11 performs various kinds of functions.

The volatile storage unit 14 includes a RAM. Once storing a prescribed amount of synthesized image and displaying the stored image through an image display function, the control unit 11 erases the displayed image and stores the latest image. That is, the volatile storage unit 14 serves as a video memory.

The image adjustment unit 15 performs a contour correction function of correcting the contour of one sheet of vehicle surrounding image synthesized from a plurality of images through an image synthesizing function, a contrast correction function of correcting the contrast of the one sheet of vehicle surrounding image, and a saturation correction function of correcting the saturation of the one sheet of vehicle surrounding image.

Specifically, the image adjustment unit 15 is configured by an electronic circuit and the like. One sheet of vehicle surrounding image that is synthesized by the control unit 11 is input to the electronic circuit or the like, and the electronic circuit or the like performs the function based on the input image.

As described above, the image processing system S2 that is configured by the control device 10 and the capturing system S3 may be considered as an image synthesizing device.

(In-vehicle Device)

The in-vehicle device 100 includes a display/operation unit 101 and a control unit 112 as shown in FIG. 2.

The display/operation unit 101 corresponds to the display device according to the present invention, and performs a display function and an operation function.

Specifically, the display/operation unit 101 is configured by a touch panel display. The display/operation unit 101 displays data the display of which is controlled by the control unit 11. Further, if a displayed icon is touched by a user, the display/operation unit 101 enables the control unit 11 to perform the function related to the icon.

The control unit 102 performs the above-described display control function, navigation function, audio function, broadcasting data communication function, and the like.

Specifically, the control unit 102 includes a CPU, a ROM, a RAM, and the like. The CPU executes a program for performing the functions stored in the ROM using the RAM that serves as a working area.

In addition, the in-vehicle device 100 includes a large-capacity storage device for storing map data required to perform a navigation function, an audio reproduction device required to perform an audio function, and a communication unit required to perform a broadcasting data communication function.

(Switches/Sensors)

To the in-vehicle network N, various kinds of switches and sensors are connected together with the control device 10 or in-vehicle device 100. The switches and the sensors may be, for example, a light switch 300, a wiper switch 301, an illumination sensor 302, and a setting switch 303.

The light switch 300 is a switch that the user operates in order to brighten the front of the vehicle 1 in the nighttime or when the vehicle passes through a tunnel, and is provided in the vicinity of a driver seat. If the light switch 300 is operated by the user, lights are turned on to brighten the front of the vehicle 1. That is, the control unit 11 of the control device 10 estimates that it is dark around the vehicle 1 when the light switch 300 is operated by the user.

The wiper switch 301 is a switch that is operated to remove water drops on a front glass or a rear glass of the vehicle 1 that the user drives in the case of rain or a dense fog, and is provided in the vicinity of a driver seat. If the wiper switch 301 is operated by the user, wipers (not shown) operate to remove the water drops on the front glass or the rear glass of the vehicle 1. That is, if the wiper switch 300 is operated by the user, the control unit 11 of the control device 10 estimates that it is raining or the fog is gathering outside the vehicle 1.

The illumination sensor 302 is to detect the degree of light that is incident to the outside or inside of the vehicle 1, and is appropriately provided in a position in which its purpose can be achieved. That is, the control unit 11 of the control device 10 estimates the brightness of the surroundings of the vehicle 1 based on a signal indicating the degree of the light detected by the illumination sensor 302, which is received in a prescribed period or timing.

The setting switch 303 is used for the user to perform a setting selection process for setting which of a first image luminance adjustment process or a second image luminance adjustment process the user makes the control unit 11 of the control device 10 perform.

[Image Processing]

Figure 3:
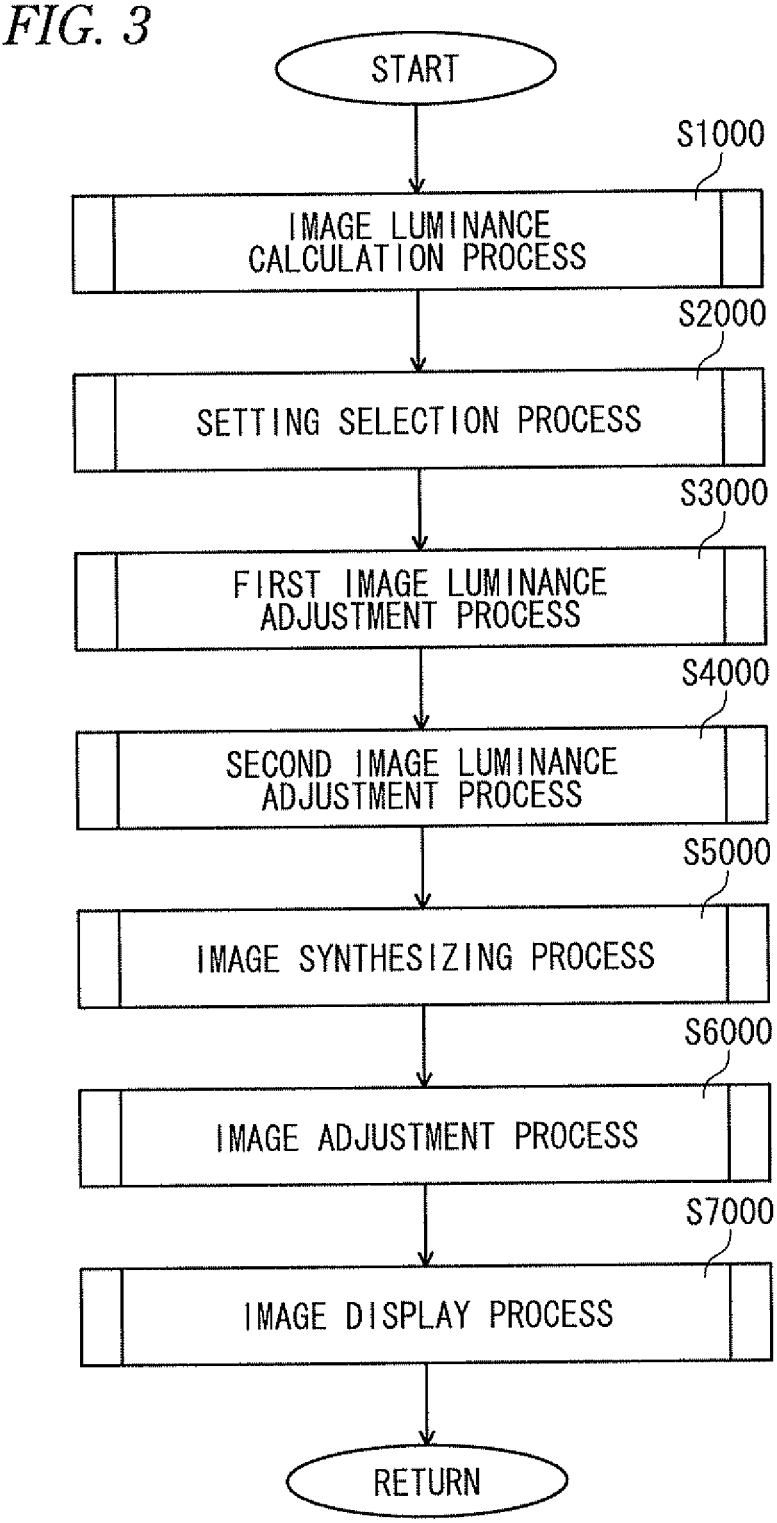
FIG. 3 is a flowchart illustrating an image process that is executed by the vehicle surrounding image display system of FIG. 2.

Then, an image processing executed by the control device 10 will be described on the basis of FIG. 3. Functions performed by the control device 10 may include an image luminance calculation function performed by the AGC unit 12, a setting selection function, a first image luminance adjustment function, a second image luminance adjustment function, an image synthesizing function, and an image display function, which are performed by the control unit 11. In addition, the functions performed by the control device 10 may further include an image adjustment function performed by the image adjustment unit 15. Further, the image adjustment function may include a contour correction function, a contrast correction function, and a saturation correction function.

In order to perform these functions, the control device 10 executes an image luminance calculation process S1000, a setting selection process S2000, a first image luminance adjustment process S3000, a second image luminance adjustment process S4000, an image synthesizing process S5000, an image adjustment process S6000, and an image display process S7000.

The control unit 11, the AGC unit 12, and the image adjustment unit 15 of the control device 10 start the execution of the image processing in the prescribed period when the user starts the control device 10. That is, the processing proceeds to step S1000 in FIG. 3.

Since the brightness of the image can be expressed as luminance, it will be hereinafter described as "luminance".

(Image Luminance Calculation Process)

In step S1000, the AGC unit 12 of the control device 10 performs an image luminance calculation process. The details of the image luminance calculation process will be described on the basis of FIG. 4.

The AGC unit 12 starts execution of the image luminance calculation process, and proceeds to step S1001.

In step S1001, the AGC unit 12 functions as an image acquirer according to the present invention, and acquires (receives) the image that is captured by the first to fourth capturing units 200 to 203 and then transmitted to the control unit 11.

Figure 5:
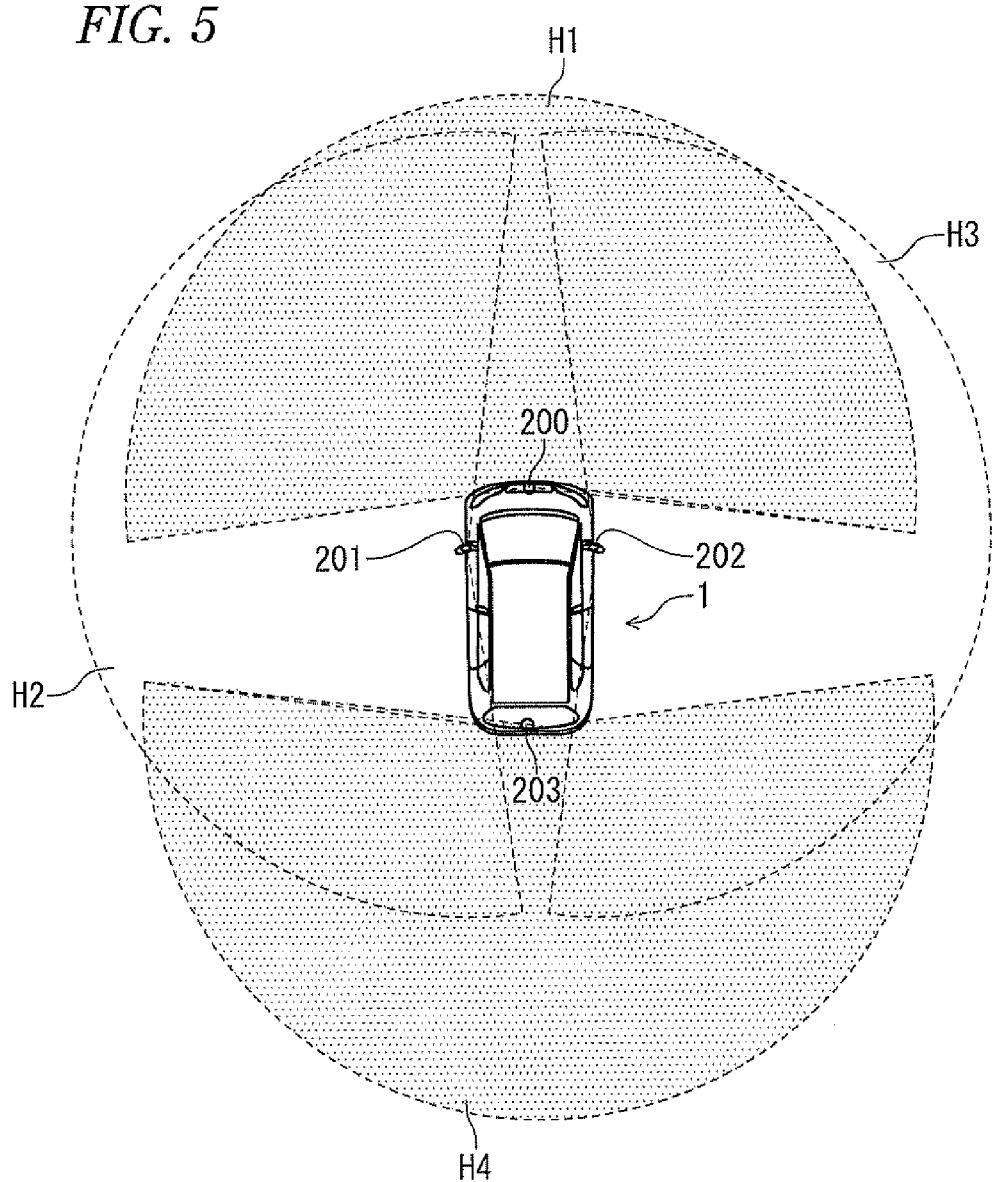
FIG. 5 is a view illustrating a reception of an image signal from a capturing unit of FIG. 4.

Here, the image (camera image according to this embodiment) captured by the first to fourth capturing units 200 to 203 will be described. As shown in FIG. 5, the first capturing unit 200 transmits an image of a capturing range H1 to the control unit 11. The second capturing unit 201 transmits an image of a capturing range H2 to the control unit 11. The third capturing unit 202 transmits an image of a capturing range H3 to the control unit 11. The fourth capturing unit 203 transmits an image of a capturing range H4 to the control unit 11. Lenses provided in the first to fourth capturing units 200 to 203 adopt fish-eye lenses or the like as described above, and have an angle of view of more than 180 degrees as indicated by the capturing ranges H1 to H4 of the first to fourth capturing units 200 to 203 as shown in FIG. 5.

Figure 6:
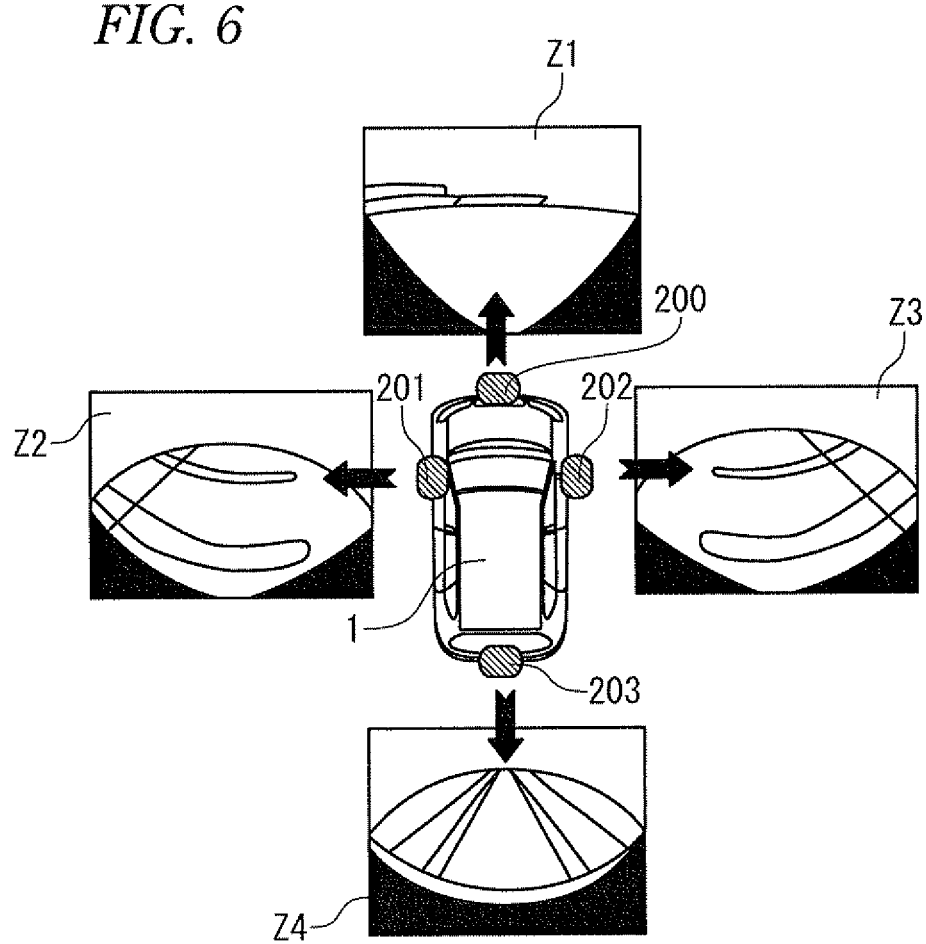
FIG. 6 is a view illustrating a reception of an image signal from a capturing unit of FIG. 4.

Accordingly, the image projected by the first capturing unit 200 becomes the vehicle surrounding image having the angle of view of more than 180 degrees in the straight direction of the vehicle 1 as shown as an image Z1 in FIG. 6. The image projected by the second capturing unit 201 becomes the vehicle image having the angle of view of more than 180 degrees in the left direction based on the straight direction of the vehicle 1 as shown as an image Z2 in FIG. 6. The image projected by the third capturing unit 202 becomes the vehicle image having the angle of view of more than 180 degrees in the right direction based on the straight direction of the vehicle 1 as shown as an image Z3 in FIG. 6. The image projected by the fourth capturing unit 203 becomes the vehicle image having the angle of view of more than 180 degrees in the reverse direction to the straight direction of the vehicle 1 as shown as an image Z4 in FIG. 6. Then, the processing proceeds to step S1002.

In step S1002, the AGC unit 12 functions as the image selector of the present invention, and calculates an average luminance for each image with respect to the images Z1 to Z4 received from the first to fourth capturing units 200 to 203. The calculation of the average luminance of the image means to divide the sum of luminances devoted for each pixel in the image by the total number of pixels. At that time, The AGC unit 12 determines whether or not the luminance devoted to the pixel exceeds a prescribed threshold value, and if the luminance exceeds the threshold value, the AGC unit 12 does not make the luminance included in the sum of luminances in calculating the average luminance, and further, does not make the luminance included in the total number of pixels. The threshold value is a value to exclude high luminance from the calculation of the average luminance of the image.

That is, if there is an extremely bright part in the image, white non-gradation (saturation) may have occurred. In this case, the average luminance is heightened due to the high luminance devoted to the pixels of the bright part, and in the later process, the image corrected on the basis of a correction coefficient obtained using the average luminance is prevented from being entirely brightened due to the influence of the high luminance of the bright part. Then, the processing proceeds to step S1003.

Figure 8:
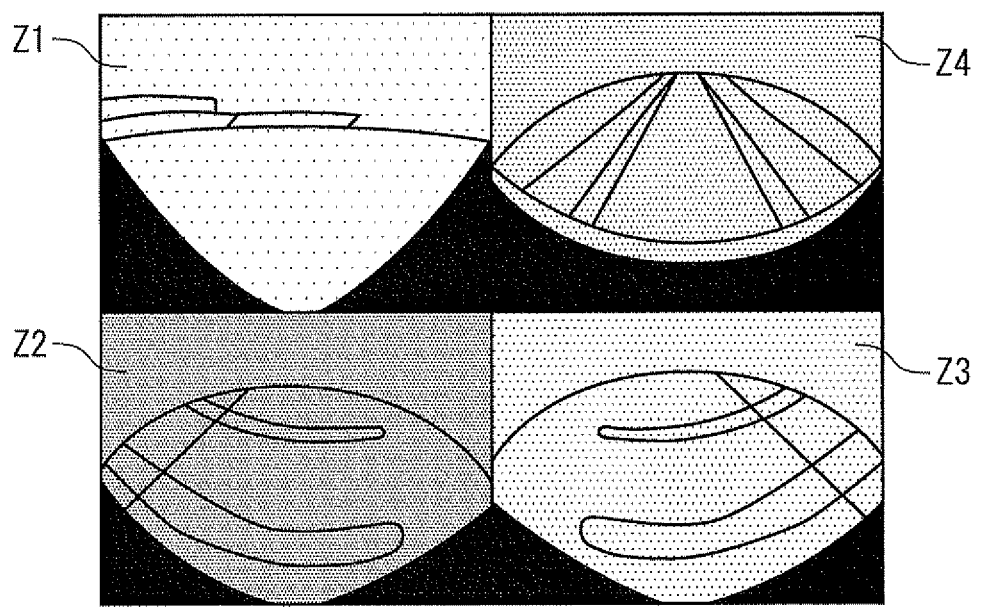
FIG. 8 is a diagram illustrating examples of performing a luminance adjustment process in the related art with respect to the camera image of FIG. 2.

In step S1003, the control unit 11 calculates the correction coefficient (gain adjustment value) based on the maximum average luminance among the average luminances calculated for the images Z1 to Z4 received from the AGC unit 12. The correction coefficient is a value obtained by dividing the maximum average luminance by the average luminance. For example, as shown in FIG. 8, if it is assumed that the average luminance of the image Z1 is the maximum, the correction coefficient of the image Z1 is a value obtained by dividing the average luminance of the image Z1 by the average luminance of the image Z1, and the correction coefficient of the image Z2 is a value obtained by dividing the average luminance of the image Z1 by the average luminance of the image Z2. Further, the correction coefficient of the image Z3 is a value obtained by dividing the average luminance of the image Z1 by the average luminance of the image Z3, and the correction coefficient of the image Z4 is a value obtained by dividing the average luminance of the image Z1 by the average luminance of the image Z4. Then, the processing proceeds to step S2000 in FIG. 3.

(Setting Selection Process)

Figure 7:
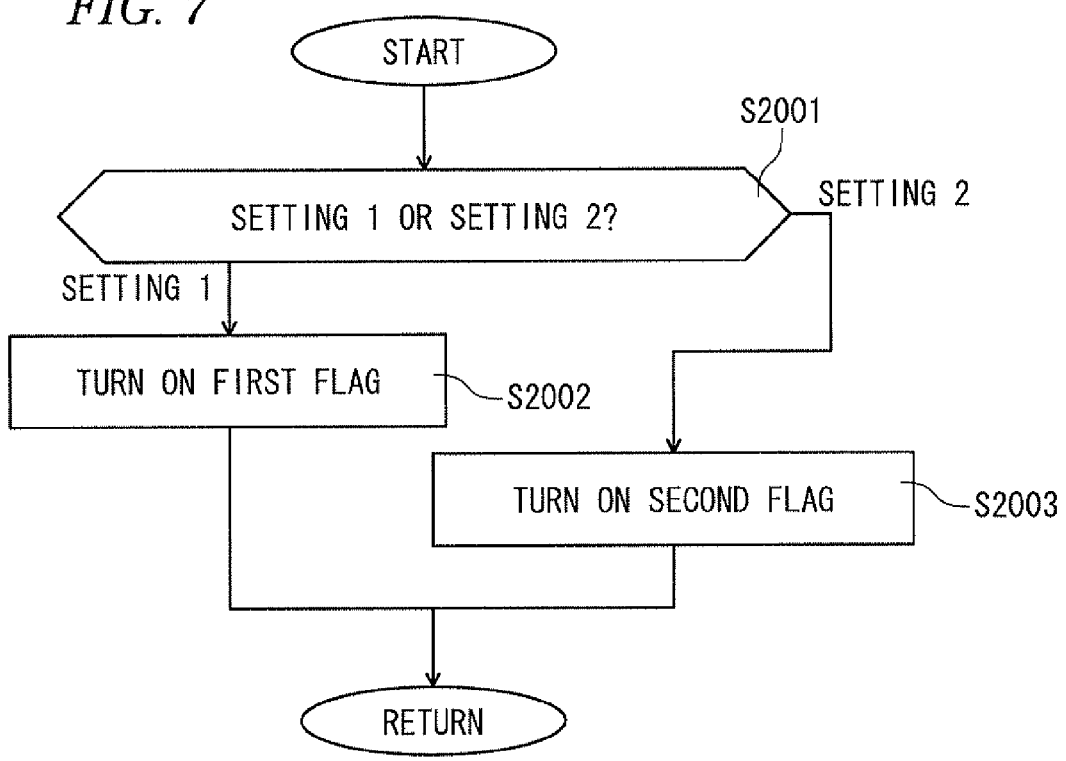
FIG. 7 is a flowchart illustrating the details of a setting selection process of FIG. 3.

In step S2000, the setting selection unit 16 of the control unit 11 performs a setting selection process. The details of the image luminance calculation process will be described on the basis of FIG. 7.

In step S2001, the control unit 11 receives a signal from the setting switch 303 through the in-vehicle network N. The control unit determines whether the received signal indicates setting 1 or setting 2. If it is determined that the received signal indicates setting 1, the control unit 11 proceeds to step S2002 (setting 1 in step S2001). If it is determined that the received signal indicates setting 2, the control unit 11 proceeds to step S2003 (setting 2 in step S2001). If a bright image and a dark image coexist in the plurality of images received from the capturing system S3, the user determines that setting 1 is valid, and if the bright image and the dark image do not coexist, the user determines that setting 2 is valid.

In step S2002, the control unit 11 turns on a first flag set in the RAM provided in the control unit 11. Then, the control unit 11 proceeds to a return.

In step S2003, the control unit 11 turns on a second flag set in the RAM provided in the control unit 11. Then, the control unit 11 proceeds to a return.

On the other hand, the first flag and the second flag set in the RAM are set to setting 1 during the manufacturing process, and the control unit 11 sets them to set values in the initial process and in the termination process. Then, the control unit 11 proceeds to step S3000 in FIG. 3.

However, as shown in FIG. 8, if the luminance difference between the image Z1 having the highest entire luminance and the image Z2 having the lowest entire luminance is large, as the case where the entire luminances in the images Z1 to Z4 differ from one another, that is, if the difference between the average luminance of the image Z1 and the average luminance of the image Z2 exceeds a prescribed value, if the luminance adjustment (luminance correction) is performed in consideration of one sheet of image into which the above-described images have been synthesized, a problem occurs in the image quality.

Figure 9:
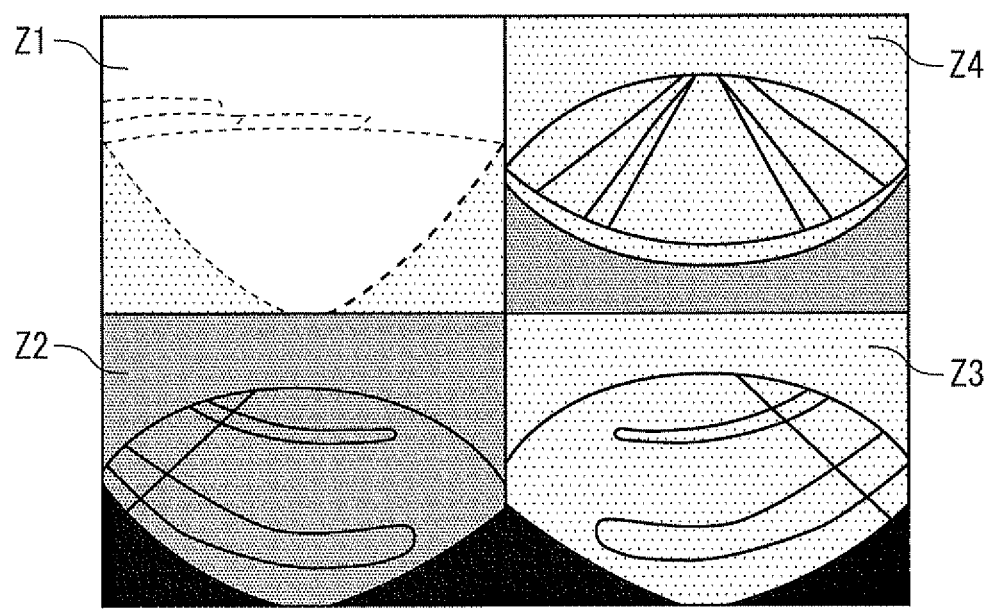
FIG. 9 is a diagram illustrating examples of performing a luminance adjustment process in the related art with respect to the camera image of FIG. 8.

This problem will be described in detail. If the control unit 11 performs the adjustment (correction) in a manner that the control unit 11 heightens the luminance of a dark pixel by a prescribed % and lowers the luminance of a bright pixel by a prescribed % after calculating the average luminance of the images Z1 to Z4 which is considered as one sheet of image, as shown in FIG. 9, the image Z2 which is too dark to be seen is brightened to be easily seen, but the image Z1 which is bright enough and is easy to be seen becomes even more brighter and is difficult to be seen to cause a problem. That is, if the extremely dark image and the brightest image are corrected based on the same average luminance, the outline of an object in the bright image becomes thinner or becomes difficult to be seen due to the extremely dark image.

As described above, in the case of the vehicle surrounding image, part of images before synthesis may become extremely dark in comparison to other images, and incidence of such problems can be sufficiently considered. For example, this refers to a case where only the rear portion of the vehicle 1 resides in a dark covered parking place or the side of the vehicle 1 is covered in the shade of buildings or the like.

Accordingly, in order to prevent such a problem from occurring and make the images Z1 to Z4 in a uniform luminance state, further processing is performed so that there is no discomfort when one sheet of synthetic image is generated.

(First Image Luminance Adjustment Process)

In step S3000, the first image luminance adjustment unit 17 of the control unit 11 functions as the first luminance adjuster, and performs the first image luminance adjustment process. The details of the first image luminance calculation process will be described on the basis of FIG. 10.

In step S3001, the control unit 11 functions as a controller according to the present invention, and determines whether or not the first flag set in the provided RAM is turned on. If it is determined that the first flag is turned on (setting 1 is valid), the control unit 11 proceeds to step S3002 ("YES" in step S3001). If it is determined that the first flag is turned off, the control unit 11 proceeds to a return ("NO" in step S3001).

In step S3002, the control unit 11 multiplies the luminances in the images Z1 to Z4 by the calculated correction coefficient. The multiplication of the images by the correction coefficient means the multiplication of the luminances devoted for respective pixels of the images by the correction coefficient.

Figure 4:
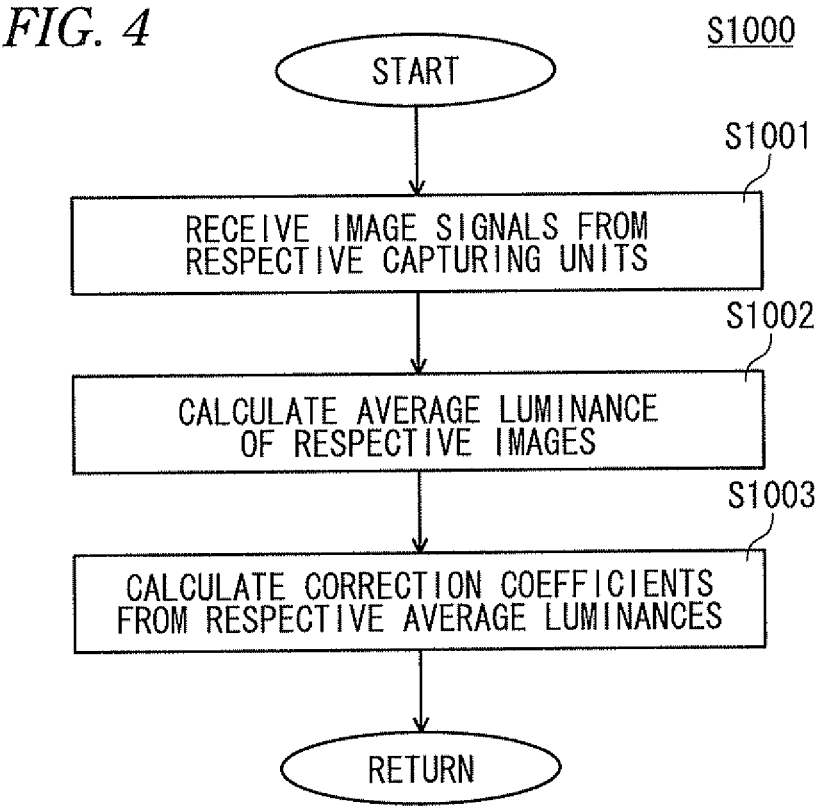
FIG. 4 is a flowchart illustrating the details of the image luminance calculation process in FIG. 3.
Figure 10:
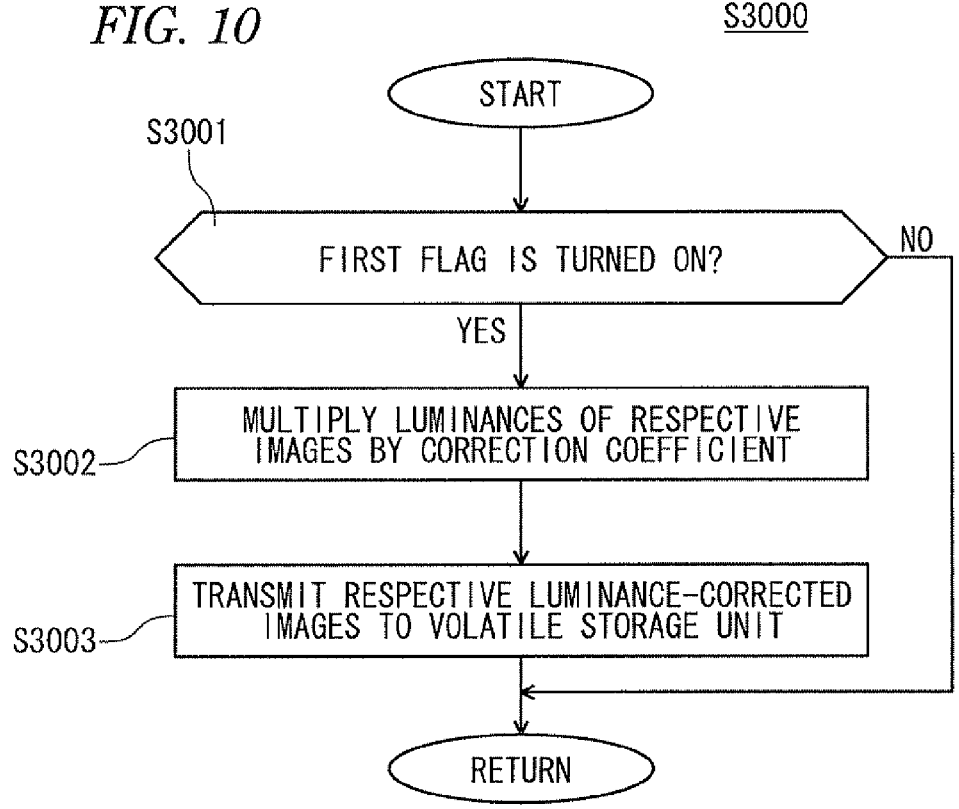
FIG. 10 is a flowchart illustrating examples of performing a first image luminance process in FIG. 3.
Figure 11:
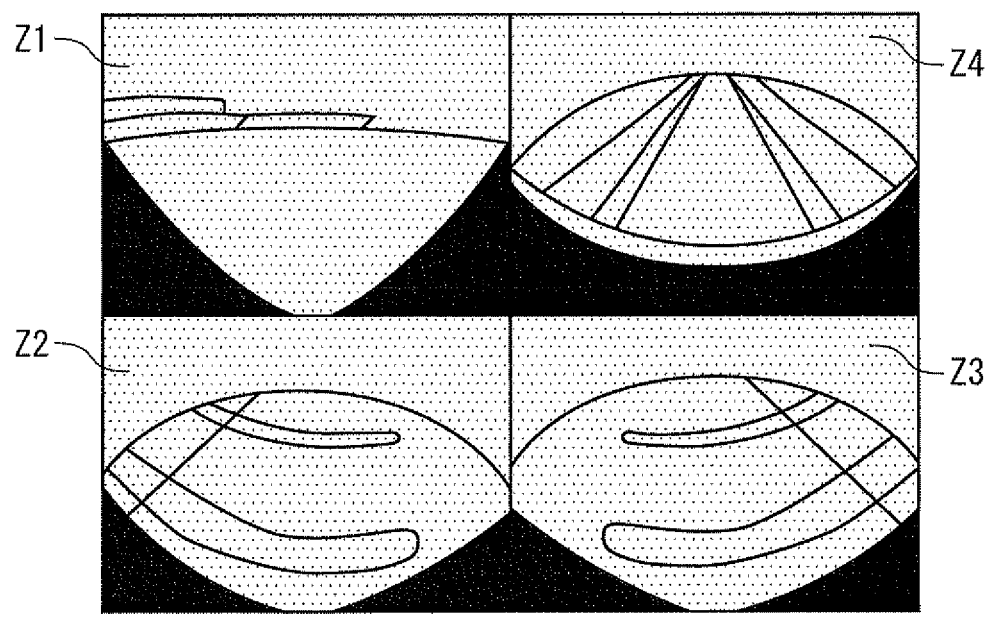
FIG. 11 is a diagram illustrating examples of performing a first image luminance adjustment process in a camera image of FIG. 8.

That is, in step S1003 of FIG. 4 and step S3002 of FIG. 10, the control unit 11 determines the image having the maximum average luminance as a representative image, and adjusts the luminances of other images based on the determined representative image. Accordingly, the luminances of the images Z1 to Z4 as shown in FIG. 11 can be sense of unity, and the visibility of the extremely dark image can be improved, so that it is possible to provide an image in which there is no discomfort for the user in the case where the images are synthesized into one sheet of vehicle surrounding image.

On the other hand, since the correction coefficient with respect to the image having the maximum average luminance, that is, the image Z1, is "1", the multiplication process may be omitted. Further, in multiplying the images Z2 to Z4 except for the image Z1 that is the image having the maximum average luminance, the multiplication process may be omitted with respect to the luminances devoted to the pixels that exceed the above-described threshold value (pixels near to saturation).

In step S3004, the control unit 11 transmits the multiplied (corrected) images Z1 to Z4 to the volatile storage unit.

Here, the reason why the images Z1 to Z4 are corrected on the basis of the correction coefficient calculated on the basis of the image having the maximum average luminance will be described.

First, in the case of expressing the images Z1 to Z4 in histogram, an ideal image having the most suitable luminance distribution is set as a representative image, and the luminances of other image may be adjusted (corrected) on the basis of this representative image. In this case, however, it is necessary to provide a circuit having a logic or software for realizing the process to cause the increase of the cost, and to avoid such disadvantages, it is necessary to estimate a simple ideal image.

Since an aperture of each capturing unit has been adjusted in advance to a level (luminance) at which the user feels the most comfortable viewing of the image based on the brightness of the vehicle surroundings in the daytime, the control unit 11 estimates that the image having the highest average luminance among the images captured through the aperture is the ideal image that the user can view most comfortably.

The reason is based on the point that an appropriate luminance correction can be performed while suppressing the increase of the cost through correction of other images on the basis of the ideal image simply estimated, that is, the image having the maximum average luminance. Then, the processing proceeds to step S4000 in FIG. 3.

(Second Image Luminance Adjustment Process)

In step S4000, the second image luminance adjustment unit 18 of the control unit 11 functions as the second luminance adjuster, and performs the second image luminance adjustment process. The details of the second image luminance calculation process will be described on the basis of FIG. 12.

In step S4001, the control unit 11 functions as a controller according to the present invention, and determines whether or not the second flag set in the RAM provided in the control unit 11 is turned on. If it is determined that the second flag is turned on (setting 2 is valid), the control unit 11 proceeds to step S4002 ("YES" in step S4001). If it is determined that the second flag is turned off, the control unit 11 proceeds to a return ("NO" in step S4001).

In step S4002, the control unit 11 adjusts (corrects) the image of which the average luminance has been calculated on the basis of the respective average luminances of the images Z1 to Z4 received from the AGC unit 12. Specifically, the control unit 11 obtains the correction coefficient (gain adjustment value) by dividing a default value by the value obtained by subtracting the correction rate from the average luminance, and multiplies (corrects) the luminance devoted to the pixels in the image of which the average luminance has been calculated. Since the correction rate is predetermined to correspond to the average luminance in a table of a register provided in the control unit 11, the control unit 11 refers to the correction rate from the table of the register based on the average luminance. Through this, the entirely dark image becomes entirely brighter, and thus can be adjusted to an image that can be easily seen by the user. Then, the processing proceeds to step S4003.

In step S4003, the control unit 11 transmits the multiplied (corrected) images Z1 to Z4 to the volatile storage unit 14. The control unit 11 proceeds to step S5000 in FIG. 3.

(Image Synthesizing Process)

Figure 13:
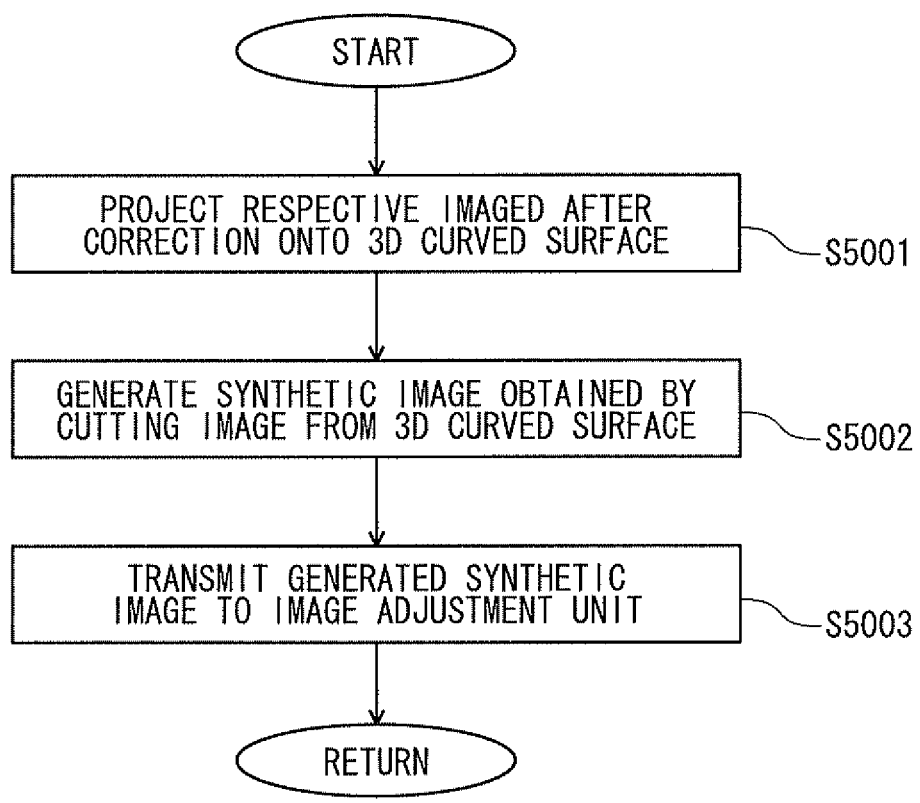
FIG. 13 is a flowchart illustrating an image synthesizing process in FIG. 3.

In step S5000, the image synthesizing unit 19 of the control unit 11 functions as the synthetic image generator according to the present invention, and performs the image synthesizing process. The details of the image synthesizing process will be described on the basis of FIG. 13.

Figure 14:
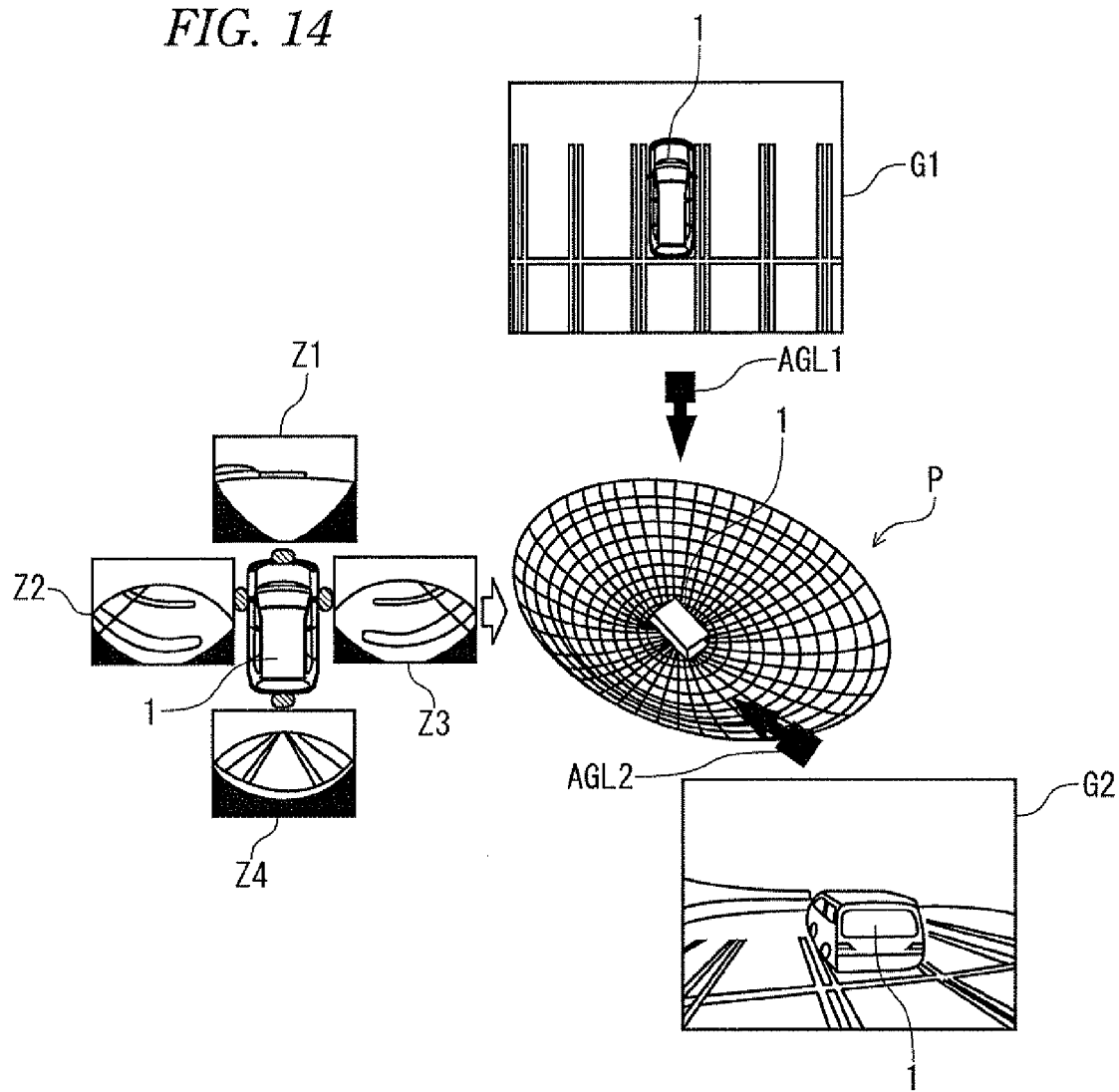
FIG. 14 is a diagram illustrating an image synthesizing process in FIG. 13.

In step S5001, the control unit 11 projects the images Z1 to Z4 after correction, which are stored in the volatile storage unit 14, onto a three-dimensional (3D) curved surface P in a virtual three-dimensional space shown in FIG. 14. The 3D curved surface P, for example, is substantially in a hemispheric shape (bowl shape), and the center portion thereof (the bottom portion of the bowl) is determined as the position in which the vehicle 1 is present. The correspondence relationship has been determined in advance between the positions of the respective pixels included in the images Z1 to Z4 and the positions of the respective pixels of the 3D curved surface P. Accordingly, the values of the respective pixels of the 3D surface P are determined on the basis of this correspondence relationship and the values of the respective pixels included in the images Z1 to Z4.

The correspondence relationship between the positions of the respective pixels of the images Z1 to Z4 and the positions of the respective pixels of the 3D curved surface P depends on the arrangement (mutual distance, height above ground, optical axis angle, and the like) of the first to fourth capturing units 200 to 203 which are four in-vehicle cameras. Because of this, table data that indicates the correspondence relationship is included in data for each vehicle model stored in the nonvolatile storage unit 13.

Further, polygon data that indicates the shape or size of the vehicle body included in the data for each vehicle model is used, and a vehicle image that is a polygon model that shows the 3D shape of the vehicle 1 is virtually configured. The configured vehicle image is arranged in the center portion of the substantially hemispheric shape that corresponds to the position of the vehicle 1 in the 3D space in which the 3D curved surface S is set.

Further, in the 3D space in which the 3D curved surface P is present, the virtual viewpoint AGL is set by the control unit 11. The virtual viewpoint AGL is defined by the viewpoint position and the viewing direction, and is set at a certain viewpoint position that corresponds to the periphery of the vehicle 1 and toward a certain viewing direction in the 3D space. Then, the processing proceeds to step S5002.

In step S5002, depending on the set virtual viewpoint AGL, a necessary region in the 3D curved surface P is cut off as the image. The relationship between the virtual viewpoint AGL and the necessary region in the 3D curved surface P is predetermined and pre-stored in the nonvolatile storage unit 13 as the table data. On the other hand, rendering is performed with respect to the vehicle image configured as a polygon to correspond to the set virtual viewpoint AGL, and two-dimensional (2D) vehicle image that is the result of the rendering overlaps the cut image. Through this, a synthetic image showing the appearance of the vehicle 9 and the periphery of the vehicle 9 viewed from a certain virtual time point are generated.

For example, if a virtual viewpoint AGL1 is set in a state where the viewpoint position is a position directly above almost the center of the position of the vehicle 1, and the viewing direction is almost directly below of the vehicle 1, a synthetic image G1 showing the appearance of the vehicle 1 (actually, vehicle image) and the periphery of the vehicle 1 viewed from almost directly above of the vehicle 1 is generated. Further, as shown in the drawing, if a virtual viewpoint AGL2 is set in a state where the viewpoint position is the left rear of the position of the vehicle 1, and the viewing direction is almost front of the vehicle 1, a synthetic image G2 showing the appearance of the vehicle 1 (actually, vehicle image) and the periphery of the vehicle 1 viewed from the left rear of the vehicle 1 to the whole periphery thereof is generated.

On the other hand, in the case of actually generating the synthetic images, it is not necessary to determine the values of all the pixels of the 3D curved surface P, but by determining only the values of the pixels of the region that becomes necessary to correspond to the set virtual viewpoint AGL on the basis of the images Z1 to Z4, the processing speed can be improved. Then, the processing proceeds to step S5003.

In step S5003, the control unit 11 transmits the generated synthetic image G1 or G2 to the image adjustment unit 15. The control unit 11 proceeds to step S6000 in FIG. 3.

(Image Adjustment Process)

Figure 15:
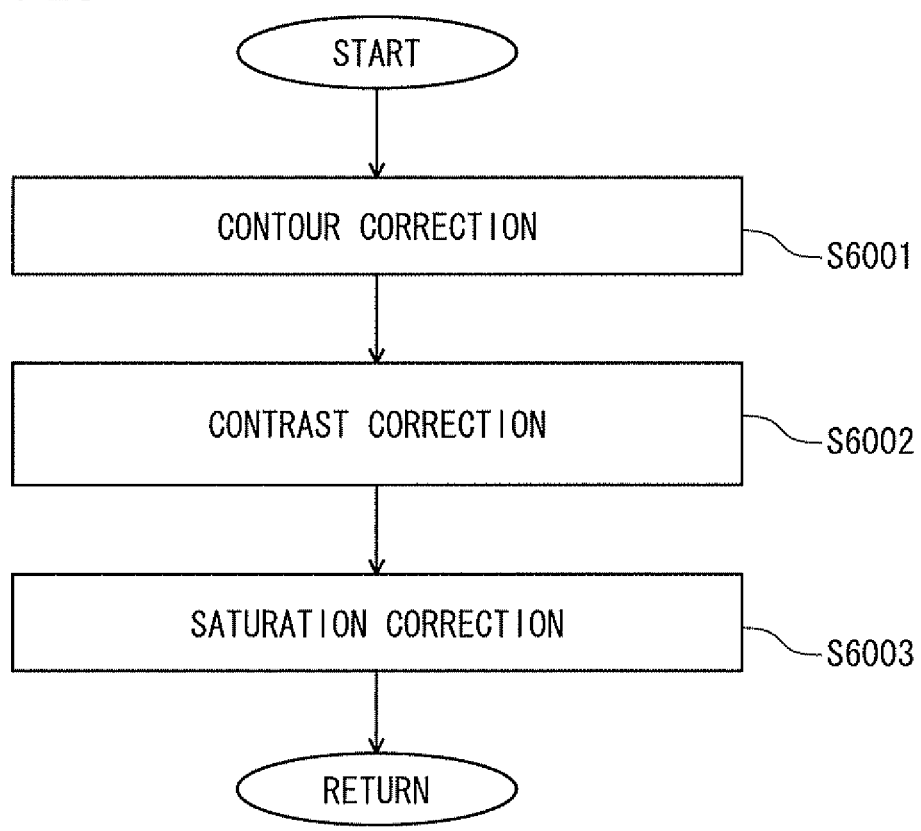
FIG. 15 is a flowchart illustrating an image adjustment process in FIG. 3.

In step S6000, the image adjustment unit 15 performs the image adjustment process. The details of the image adjustment process will be described on the basis of FIG. 15.

In step S6001, the image adjustment unit 15 corrects the contour of an object in the synthetic image G1 or G2 received from the control unit 11. The contour correction is, for example, to adjust the intensity of the contour of the object depending on the perspective or to perform smoothing correction of a curved line. Then, the processing proceeds to step S6002.

In step S6002, the image adjustment unit 15 corrects the contrast between objects or parts of the objects in the synthetic image G1 or G2 received from the control unit 11. The contrast correction is, for example, to adjust the intensity of the contrast between the objects or parts of the objects depending on the perspective. Then, the processing proceeds to step S6003.

In step S6003, the image adjustment unit 15 corrects the saturation between the objects in the synthetic image G1 or G2 received from the control unit 11. The saturation correction is, for example, to adjust the intensity of the color of the object depending on the perspective. Then, the processing proceeds to step S7000 in FIG. 3.

(Image Display Process)

Figure 16:
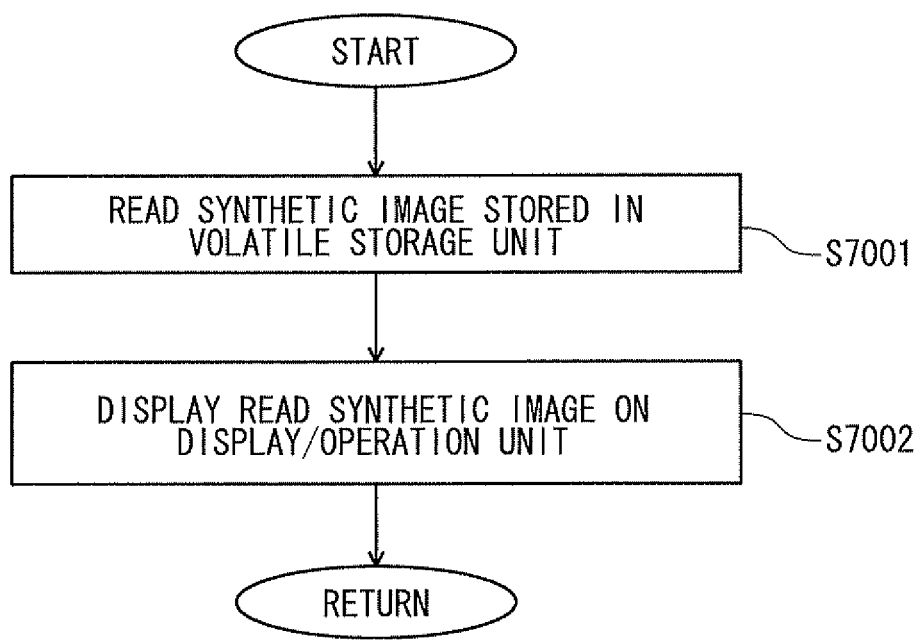
FIG. 16 is a flowchart illustrating an image display process in FIG. 3.

In step S7000, the image display unit 20 of the control unit 11 functions as the image provider according to the present invention. The details of the image display process will be described on the basis of FIG. 16.

In step S7001, the image display unit 14 reads the synthetic image stored in the volatile storage unit 14. At that time, if the synthetic image G1 or G2 stored in the volatile storage unit 14 exceeds a certain amount, the image display unit 20 erases the oldest synthetic image and store the latest synthetic image, or performs a storage control to overwrite the latest synthetic image onto the oldest synthetic image. Then, the processing proceeds to step S7002.

In step S7002, the image display unit 20 displays the synthetic image G1 or G2 read from the volatile storage unit 14 on the display operation unit 101 provided in the in-vehicle device 100. Specifically, the image display unit 20 updates and displays the synthetic image G1 or G2 stored in the volatile storage unit 14 from the old image to the new image in a prescribed period.

MODIFIED EXAMPLES

Although the first embodiment of the present invention has been described, the present invention is not limited to the described embodiment, and various modifications may be made. Hereinafter, such modified examples will be described. Forms to be described hereinafter may be appropriately combined.

Modified Example 1

In the first embodiment, in step S1002 of FIG. 4, the AGC unit 12 determines whether or not the luminance devoted to the pixels exceeds the constant threshold value when calculating the average luminance of the images Z1 to Z4 received from the first to fourth capturing units 200 to 203. As described above, if the luminance exceeds the threshold value, the AGC unit 12 does not make the luminance included in the sum of the luminance in calculating the average luminance, and further, does not make the luminance included in the total number of pixels. However, the control unit 11 of the control device 10 may determine the brightness of the outside of the vehicle and calculate the average luminance based on the threshold value that corresponds to the brightness of the outside of the vehicle.

For example, in the case of determining that the outside of the vehicle is dark, the control unit 11 sets the threshold value to a threshold value that is higher than the above-described threshold value, while in the case of determining that the outside of the vehicle is bright, the control unit 11 set the threshold value to a threshold value that is lower than the above-described threshold value.

Specifically, the control unit 11 determines that the outside of the vehicle is dark if it receives a turn-on signal of the light switch 300 that is connected to the in-vehicle network N, and determines that the outside of the vehicle is bright if it receives the turn-off signal of the light switch 300. Further, the control unit 11 determines that the outside of the vehicle is dark if it receives a turn-on signal of the wiper switch 301 that is connected to the in-vehicle network N, and determines that the outside of the vehicle is bright if it receives the turn-off signal of the wiper switch 301. Further, the control unit 11 determines the brightness of the outside of the vehicle depending on the signal level of a signal of the illumination sensor 302 if it receives the signal of the illumination sensor 302 that is connected to the in-vehicle network N, and varies the threshold value depending on the brightness of the outside of the vehicle.

On the other hand, this threshold value may be optionally set by the user.

By changing the threshold value depending on the brightness of the outside of the vehicle, the average luminance that is the basis of the coefficient for correcting the image luminance is set to the dark side if the outside of the vehicle is bright, while the average luminance is set to the bright side if the outside of the vehicle is dark. Accordingly, the visibility of the corrected image can be improved on the basis of the average luminance.

Modified Example 2

Figure 12:
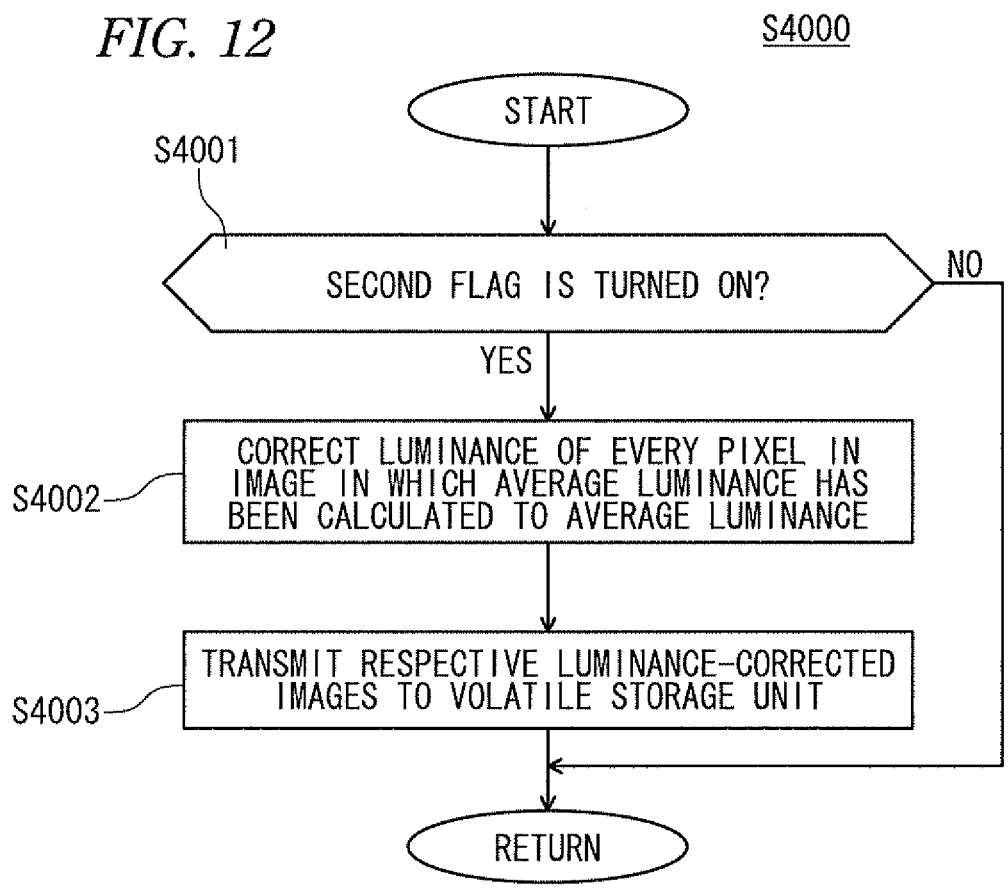
FIG. 12 is a flowchart illustrating a second image luminance adjustment process in FIG. 3.

In the first embodiment as described above, in step S2001 of FIG. 7, the control unit 11 receives the signal from the setting switch 303 through the in-vehicle network N, and determines whether the received signal indicates setting 1 or setting 2. If it is determined that the received signal indicates setting 1, the control unit 11 performs the first image luminance adjustment process as shown in FIG. 10, and if it is determined that the received signal indicates setting 2, the control unit 11 performs the second image luminance adjustment process as shown in FIG. 12. However, the control unit 11 determines whether or not the difference between the highest average luminance and the lowest average luminance among the average luminances of the images Z1 to Z4 received from the AGC unit 12 is larger than the prescribed value, and if it is determined that the difference is larger than the prescribed value, the control unit 11 turns on the first flag to perform the first image luminance adjustment process shown in FIG. 10. If it is determined that the difference is not larger than the prescribed value, the control unit 11 turns on the second flag to performs the second image luminance adjustment process shown in FIG. 12.

On the other hand, the prescribed value has been predetermined as a value for determining a case where the image combination causes the above-described problem. Further, the first flag and the second flag are turned off in the initial process and in the termination process, and are also turned off when the purpose of the function is terminated.

That is, if the combination of the images captured by the first to fourth capturing units 200 to 203 indicates a pattern that causes the above-described problem, the first image luminance adjustment process is performed. On the other hand, if the combination of the images does not indicate a pattern that causes the above-described problem, the first image luminance adjustment process is not performed, but the second image luminance adjustment process is performed to prevent the deterioration of the image.

Modified Example 3

In the first embodiment as described above, in step S2001 of FIG. 7, the control unit 11 receives the signal from the setting switch 303 through the in-vehicle network N, and determines whether the received signal indicates setting 1 or setting 2. If it is determined that the received signal indicates setting 1, the control unit 11 performs the first image luminance adjustment process as shown in FIG. 10, and if it is determined that the received signal indicates setting 2, the control unit 11 performs the second image luminance adjustment process as shown in FIG. 12. However, if a condition that any average luminance that exceeds an upper limit value and any average luminance that exceeds a lower limit value are present among the average luminances of the images Z1 to Z4 received from the AGC unit 12, is satisfied, the control unit 11 may turn on the first flag to perform the first image luminance adjustment process shown in FIG. 10, and if the condition is not satisfied, the control unit 11 may turn on the second flag to perform the second image luminance adjustment process shown in FIG. 12.

On the other hand, the upper limit value and the lower limit value have been predetermined as values for determining a case where the image combination causes the above-described problem.

That is, if the combination of the images captured by the first to fourth capturing units 200 to 203 indicates a pattern that causes the above-described problem, the first image luminance adjustment process is performed. On the other hand, if the combination of the images does not indicate a pattern that causes the above-described problem, the first image luminance adjustment process is not performed, but the second image luminance adjustment process is performed to prevent the deterioration of the image.

<Second Embodiment>

Then, a vehicle surrounding image display system according to a second embodiment of the present invention will be described. The same reference numerals are given to the elements having the same, similar, and equivalent configurations and functions as shown in the first embodiment, and any duplicate description thereof will be omitted.

(Control Device)

Figure 17:
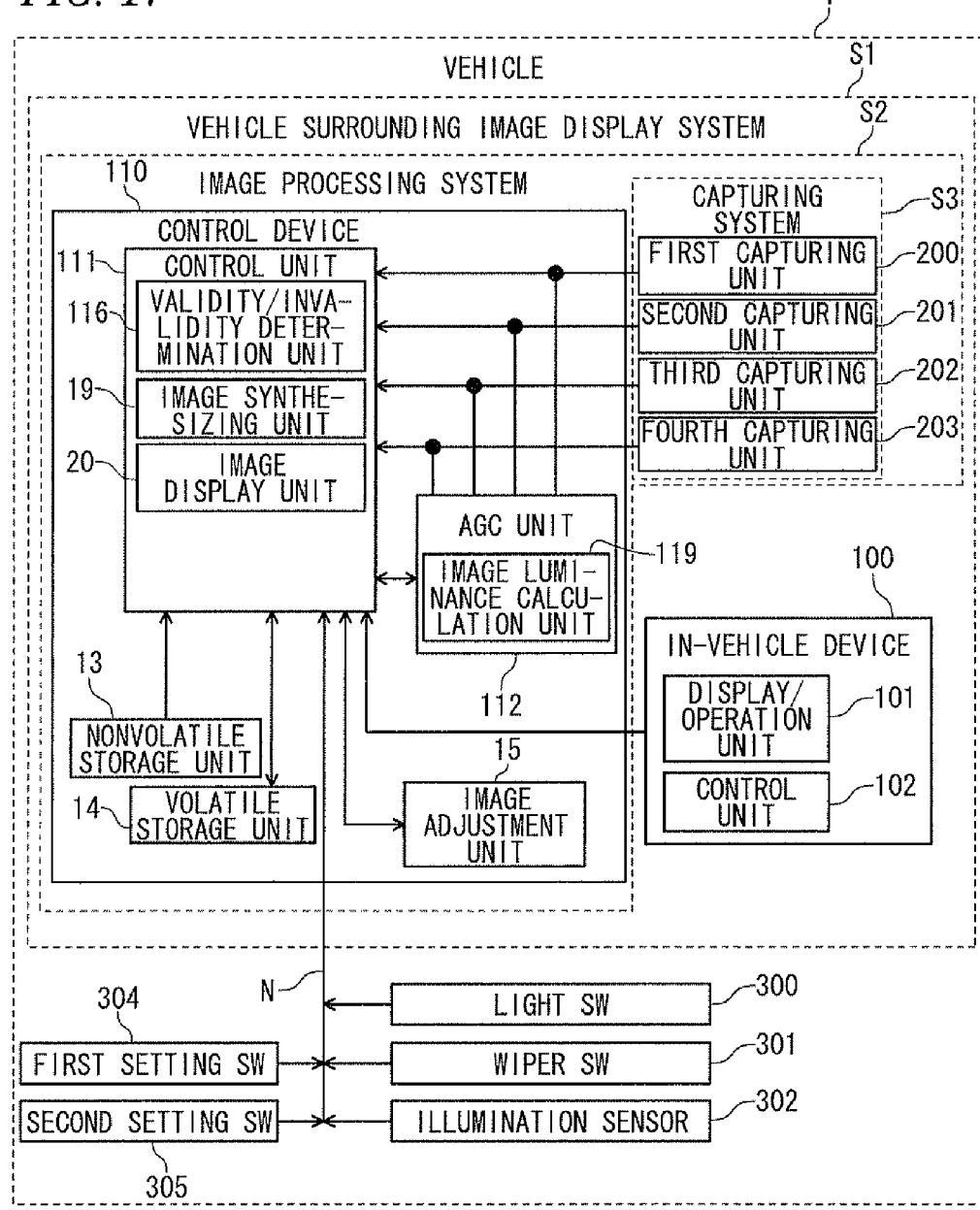
FIG. 17 is a system block diagram of a vehicle surrounding image display system according to a second embodiment of the present invention.

The control device 110 according to this embodiment corresponds to the image processing device according to the present invention, and as shown in FIG. 17, includes a control unit 111, an AGC unit 112, a nonvolatile storage unit 13, a volatile storage unit 14, and an image adjustment unit 15.

The control unit 111 includes an image luminance adjustment unit 116, an image synthesizing unit 19, and an image display unit 20. That is, the control unit 111 performs an image luminance adjustment function, an image synthesizing function, and an image display function.

Specifically, the control unit 111 is configured as a computer having a CPU, a RAM, a ROM, and the like, and the CPU executes a program for performing the functions stored in the ROM using the RAM that serves as a working area.

The AGC unit 112 includes an image luminance calculation unit 2119. That is, the AGC unit 112 performs an image luminance calculation function to be described later.

Figure 18:
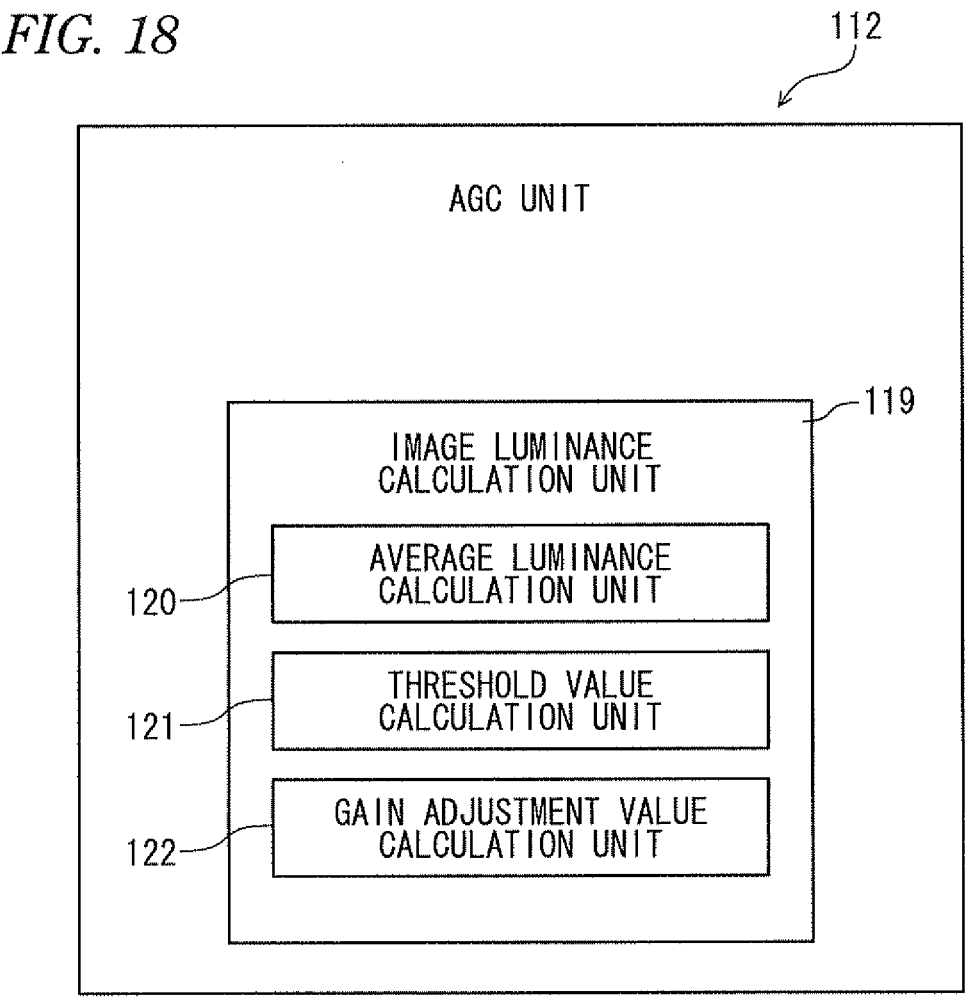
FIG. 18 is a system block diagram of an AGC unit in the vehicle surrounding image display system of FIG. 17.

Further, as shown in FIG. 18, the image luminance calculation unit 119 includes an average luminance calculation unit 120, a threshold value calculation unit 121, and a gain adjustment value calculation unit 122. That is, the image luminance calculation unit 119 performs an average luminance calculation function, a threshold value calculation function, and a gain control value calculation function.

(Switches/Sensors)

To the in-vehicle network N, various kinds of switches and sensors are connected together with the control device 110 or in-vehicle device 100. The switches and the sensors may be, for example, a light switch 300, a wiper switch 301, an illumination sensor 302, a first setting switch 303, and a second setting switch 305.

The first setting switch 304 receives an on/off setting of a threshold adjustment function (following function) to be described later. Further, the second setting switch 305 is an operation unit that receives, from the user, settings for image correction using any one of the average luminance and the maximum value to be described later in the control unit 111 of the control device 110.

[Image Processing]

Then, an image processing executed by the control device 110 will be described on the basis of FIG. 19. Functions performed by the control device 110 may include an image luminance calculation function performed by the AGC unit 112, an image luminance adjustment function, an image synthesizing function, and an image display function, which are performed by the control unit 11. In addition, the image luminance calculation function may include an average luminance calculation function, a threshold value calculation function, and a gain adjustment calculation function.

Further, the image adjustment unit performs an image adjustment function. The image adjustment function may include a contour correction function, a contrast correction function, and a saturation correction function.

In order to perform these functions, the control device 110 executes an image luminance calculation process S1500, an image luminance adjustment process S2500, an image synthesizing process S5000, an image adjustment process S6000, and an image display process S7000.

Figure 19:
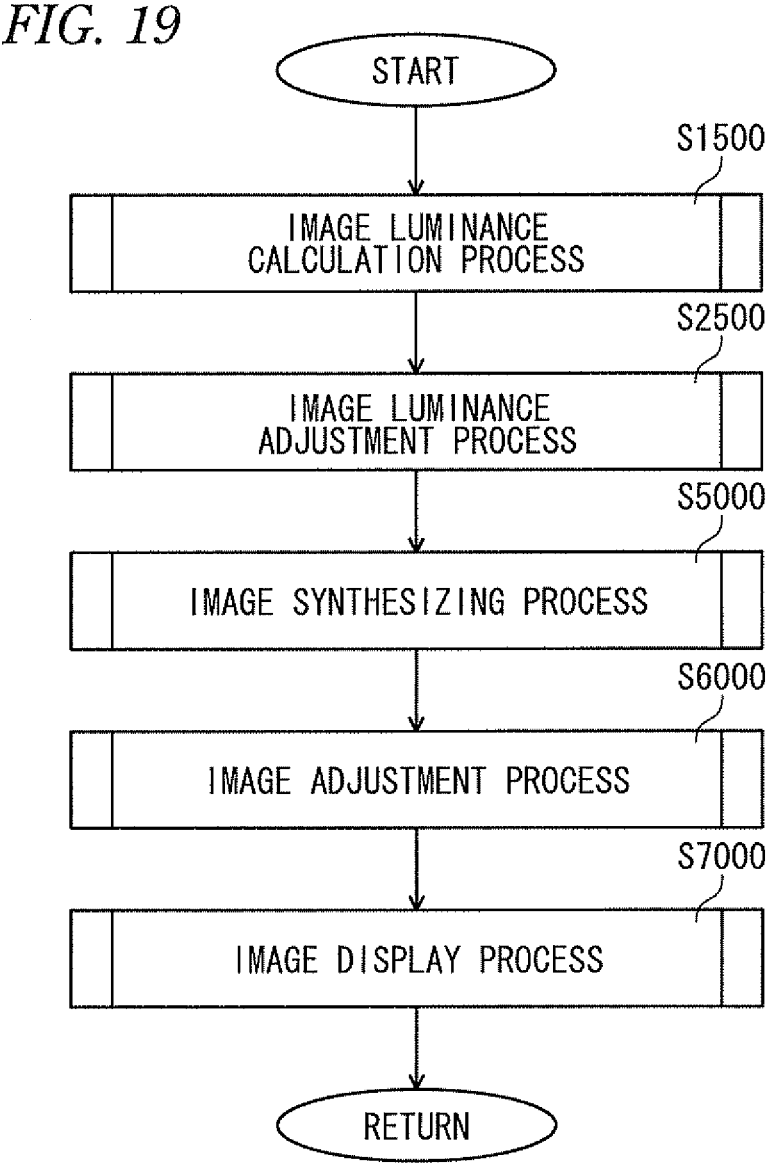
FIG. 19 is a flowchart illustrating an image process that is executed by the vehicle surrounding image display system of FIG. 17.

The control unit 111, the AGC unit 112, and the image adjustment unit 15 of the control device 110 repeatedly perform the image process shown in FIG. 19 in the prescribed period when the user starts the control device 110. In the capturing system S3, the image is acquired in the prescribed period, and the acquired image is successively input from the capturing system S3 to the control device 110 to be processed as shown in FIG. 19.

Since the brightness of the image can be expressed as luminance, it will be hereinafter described as "luminance".

(Image Luminance Calculation Process)

In step S1500, the AGC unit 112 of the control device 110 performs an image luminance calculation process. The details of the image luminance calculation process will be described on the basis of FIG. 20.

The image luminance calculation unit 119 starts execution of the image luminance calculation process, and proceeds to step S1501.

In step S1501, the image luminance calculation unit 119 functions as the image acquirer according to the present invention, and acquires (receives) the image (see FIGS. 5 and 6) that is captured by the first to fourth capturing units 200 to 203 and then transmitted to the control unit 111.

In step S1502, the average luminance calculation unit 120 of the image luminance calculation unit 119 functions as the first average calculator according to the present invention, and calculates average luminances for a plurality of regions that are obtained by dividing the images Z1 to Z4 received from the first to fourth capturing units 200 to 203. Here, each region includes a plurality of pixels. The calculation of the average luminance of the image means to divide the sum of luminances devoted for each pixel in the region by the total number of pixels in the region.

Figure 21:
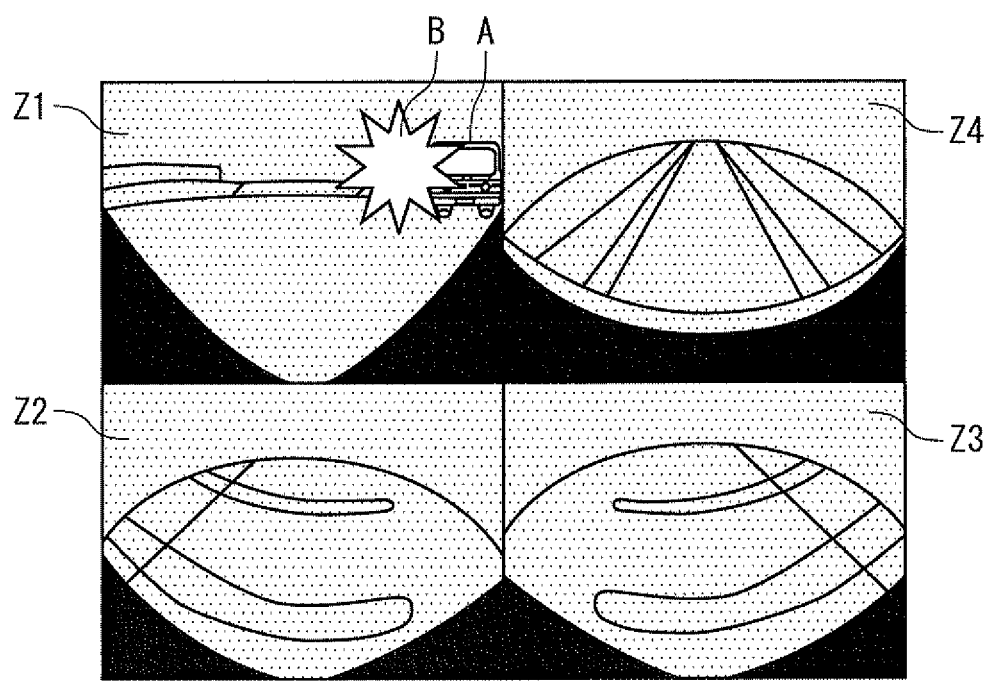
FIG. 21 is a diagram illustrating examples of camera images received from the capturing unit of FIG. 18.
Figure 22:
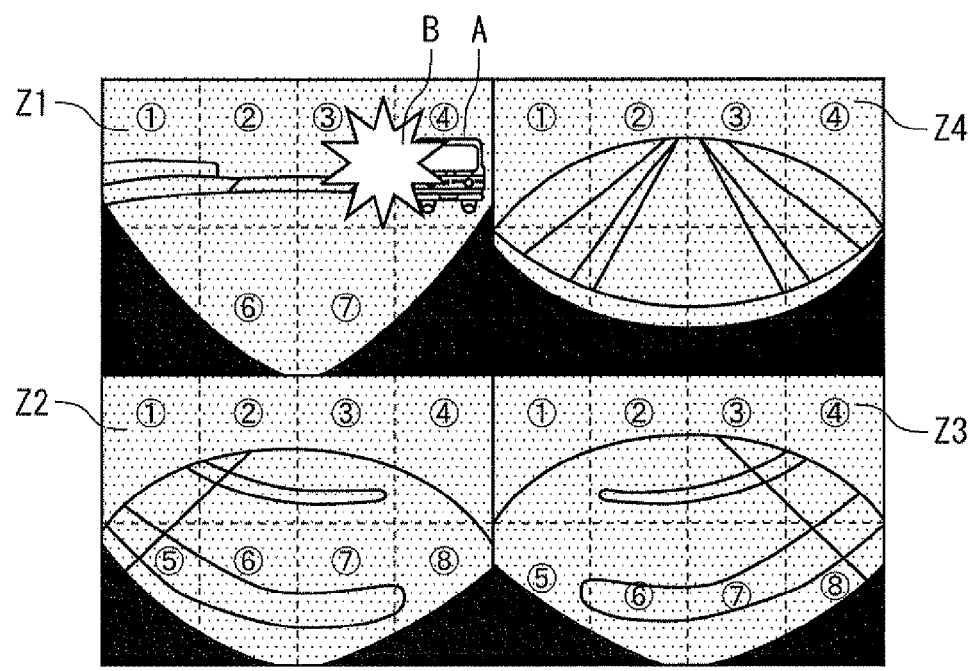
FIG. 22 is a diagram illustrating examples of performing an image luminance calculation process of FIG. 20 with respect to the camera image of FIG. 21.

For example, the average luminance calculation unit 120 divides the images Z1 to Z4 shown in FIG. 21 into eight regions as shown in FIG. 22, and calculates the average luminance for each region as the first average luminance (first average value according to the present invention).

At that time, the average luminance calculation unit 120 functions as the region selector and the second average calculator according to the present invention, and determines whether or not the first average luminance exceeds the threshold value. If the first average luminance exceeds the threshold value, the average luminance calculation unit 120 identifies all the regions except for the region in which the average luminance has been calculated as target regions. Further, the average luminance calculation unit 120 calculates the average luminance of the pixels included in the target region as the second average luminance (second average value according to the present invention). That is, the average luminance calculation unit 120 determines the regions in which the first average luminance is lower than the threshold value among the plurality of divided regions as the target regions, and calculates the second average luminance based on the luminance of the pixels included in the target regions. On the other hand, the regions in which the first average luminance exceeds the threshold value among the plurality of divided regions become non-target regions that are excluded from the following process.

For example, the average luminance calculation unit 120 determines whether or not the first average luminance for each region exceeds the threshold value in the regions 1 to 8 of the images Z1 to Z4 shown in FIG. 22, and if it is determined that the first average luminance of the region 3 and region 4 in the image Z1 as shown in FIG. 22 exceeds the threshold value, the average luminance calculation unit 120 determines the regions except for the region 3 and region 4 in the image Z1 and all regions in the images Z2 to Z4 as the target regions, and calculates the average luminances of the target regions.

That is, since the light of headlights of a vehicle A that travels the opposite lane is reflected from the region 3 and region 4, the region 3 and region 4 in the image Z1 shown in FIG. 22 have extremely high average luminance as compared with other regions in the image Z1, and thus the region 3 and region 4 in the image Z1 from which the light B of the headlights is reflected are excluded from calculation of the average luminances. Further, the reason why the average luminances are calculated in the regions except for the region 3 and region 4 in the image Z1 and all regions in the images Z2 to Z4 is that the images Z1 to Z4 are synthesized into one sheet of vehicle surrounding image later on.

On the other hand, the average luminance calculation unit 120 uses an initial value that is stored in the nonvolatile storage unit 13 as the threshold value for calculating the first average luminance.

Then, in step S1503, the threshold value calculation unit 121 of the AGC unit 112 calculates the threshold value that is used in step S1502 of the image luminance calculation process with respect to the next input target image.

In the following description, the average luminance calculated for each region is considered as the first average luminance, and the average luminance calculated in all regions except for the region in which the first average luminance that exceeds the threshold value is calculated is considered as the second average luminance.

If the turn-on signal is received from the first setting switch 304 through the in-vehicle network N, the threshold value calculation unit 121 of the AGC unit 112 determines that the threshold value following function is turned on by the user, and calculates the threshold value (threshold value used for the next still image that forms a moving image) that is used in step S1502 in the next image process execution period based on the second average luminance.

Specifically, the threshold value calculation unit 121 functions as the threshold value updater according to the present invention, and calculates the next threshold value (updates the current threshold value to the calculated value) through addition of a prescribed value pre-stored in the register provided in the AGC unit 112 to the second average luminance.

Further, if the turn-off signal is received from the first setting switch 304 through the in-vehicle network N, the threshold value calculation unit 121 determines that the threshold value following function is turned off by the user, and set the threshold value to be used in step S1502 in the next image process execution period.

Specifically, the threshold value calculation unit 121 sets the threshold value to return to the initial value without updating the currently set threshold value.

Then, in step S1504, if the turn-on signal is received from the second setting switch 305 through the in-vehicle network N, the gain adjustment value calculation unit 122 of the AGC unit 112 determines that the first mode is turned on by the user, and calculates the gain adjustment value based on the second average luminance.

Specifically, the gain adjustment value calculation unit 122 calculates the gain adjustment value by dividing the value obtained by subtracting the correction rate from the second average luminance by a default value. Since the correction rate is predetermined to correspond to the average luminance in the table of the register provided in the AGC unit, the gain adjustment value calculation unit 122 refers to the correction rate from the table of the register based on the average luminance. If the image is adjusted based on the gain adjustment value, too dark part becomes brighter and too bright part becomes darker on the basis of the second average luminance. Accordingly, the entire image can give the impression of calm to the user, and as a result, the user can easily view the image.

Further, if the turn-off signal is received from the second setting switch 305 through the in-vehicle network N, the gain adjustment calculation unit 122 of the AGC unit 112 determines that the second mode is turned on by the user, and calculates the gain adjustment value based on the maximum value (peak value) of the luminance in the target region in which the first average luminance is lower than the threshold value.

Specifically, the gain adjustment value calculation unit 122 calculates the correction rate that corresponds to each luminance based on the maximum value of the luminance. Since the correction rate is predetermined to correspond to the maximum value of the luminance in the table of the register provided in the AGC unit, the gain adjustment value calculation unit 122 refers to the correction rate from the table of the register based on the maximum value of the luminance. Through this, the bright part is substantially maintained, and the dark part becomes brighter. Accordingly, the image quality is prevented from deteriorating due to the white non-gradation of the already bright part, and the dark part can be brightened. Then, the processing proceeds to step S2500 in FIG. 19.

(Image Luminance Adjustment Process)

Figure 23:
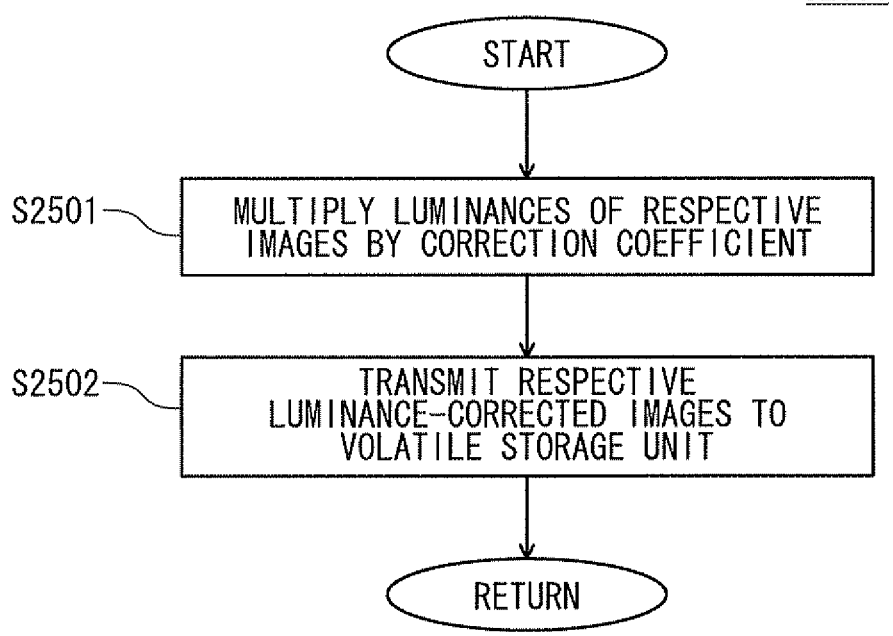
FIG. 23 is a flowchart illustrating the details of the image luminance adjustment process in FIG. 19.

In step S2500, the image luminance adjustment unit 116 of the control unit 111 functions as the luminance adjuster according to the present invention, and performs the image luminance adjustment process. The details of the image luminance calculation process will be described on the basis of FIG. 23.

In step S2501, the image luminance adjustment unit 116 of the control unit 111 adjusts (corrects) the images Z1 to Z4 based on the gain adjustment value received from the AGC unit 112.

Specifically, the image luminance adjustment unit 116 multiplies the luminance devoted to the pixels in the images Z1 to Z4 by the gain adjustment value.

On the other hand, with respect to the luminance devoted to the pixels in the non-target region that has not been subject to calculation of the second average luminance, the adjustment (correction) through the gain adjustment may be omitted. Then, the processing proceeds to step S2502.

In step S2502, the control unit 111 transmits the adjusted (corrected) images Z1 to Z4 to the volatile storage unit 14.

Figure 24:
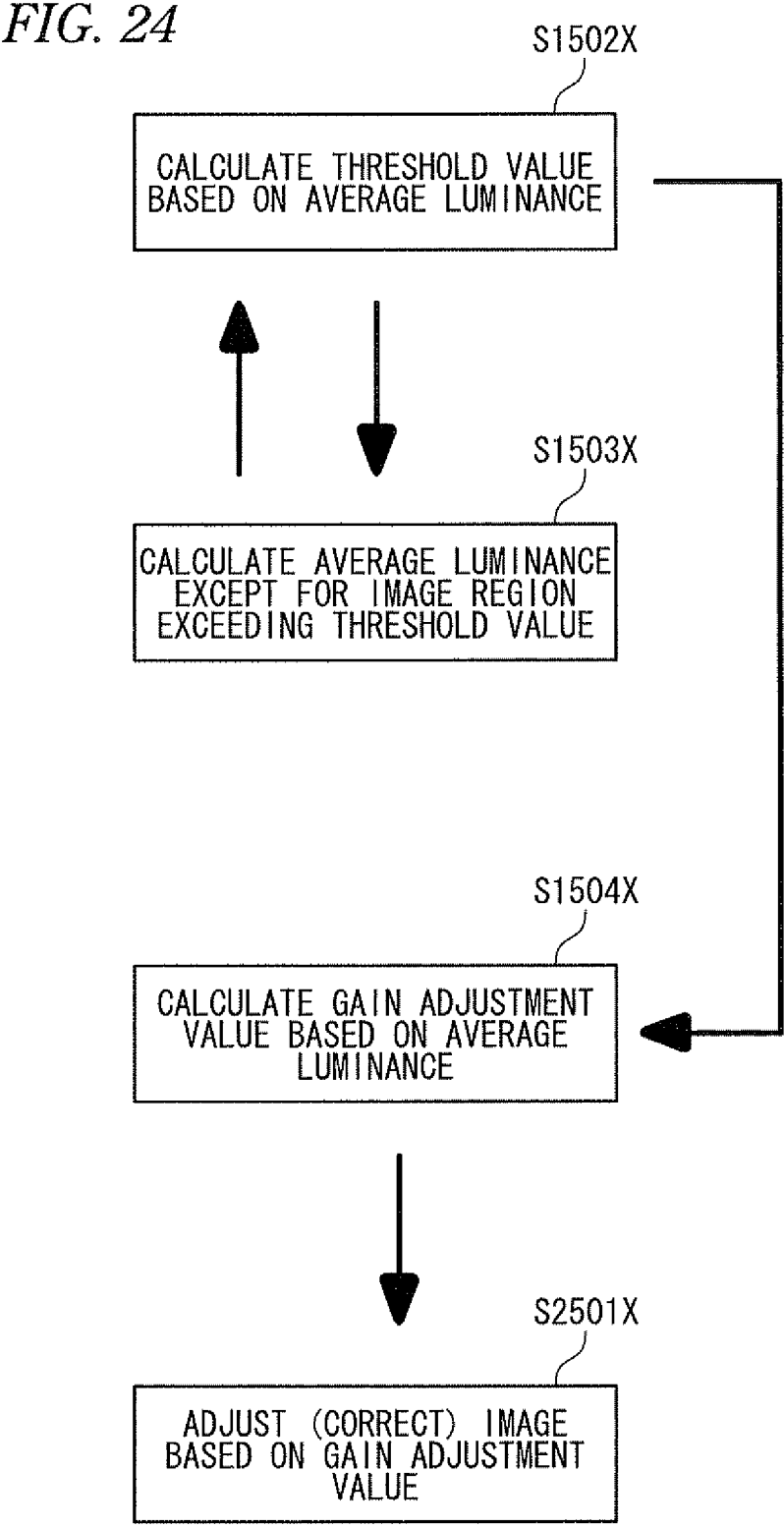
FIG. 24 is a diagram illustrating the details of the image adjustment process of FIG. 23.

The overall flow of the above-described image luminance calculation process and the image luminance adjustment process is simply shown in FIG. 24. That is, in the process of successively receiving vehicle surrounding images from a first capturer 200 and a second capturer 203 in a prescribed period, the control unit 111 and the AGC unit 112 repeatedly perform (loop), until the image process is finished, calculating the second average luminance of the images Z1 to Z4 received this time by the threshold value calculated on the basis of the second average luminance of the images Z1 to Z4 previously received (step S1502X), and calculating the second average luminance of the images Z1 to Z4 to be received next time on the basis of the second average luminance of the images Z1 to Z4 calculated this time (step S1503X). In the loop process, after processing step S1502X, the control unit 111 and the AGC unit 112 repeatedly perform, in parallel, until the image process is finished, calculating the gain adjustment value based on the second average luminance (step S1504X), and then, adjusting (correcting) the images Z1 to Z4 based on the gain adjustment value (step S2501X).

Accordingly, in the image luminance calculation process, in the case where the first setting switch 304 is turned on by the user, by calculating the gain adjustment value based on the second average luminance calculated except for the region in which the luminance is extremely high, the image can be adjusted (corrected) based on the gain adjustment value in the image luminance adjustment process. Accordingly, the problem can be prevented from occurring, in that the adjusted (corrected) image becomes entirely dark and the originally dark part is not brightened due to the influence of the region in which the luminance is extremely high.

Further, since the luminance that becomes extremely high due to the light B from the lights of the vehicle A occupies a prescribed area, the comparison of the threshold value with the luminances devoted to the pixels is not performed, but the comparison of the threshold value with the average luminance of the image region. Accordingly, the processing load at that time can be lightened.

Further, in the image luminance calculation process that is performed in the next period based on the second average luminance calculated in the image luminance calculation process performed in this image process execution period, since the threshold values that are used to calculate the second average luminance is calculated (updated), the threshold values, which correspond to the images successively captured while the state of the vehicle 1 is changed such as traveling, can be set, appropriate gain adjustment values can be calculated through the second average luminance calculated on the basis of the threshold values, and appropriate images can be adjusted (corrected) by the gain adjustment values. That is, it is possible to make the threshold values used in the image luminance calculation process follow the images with various luminance distribution variations. Then, the processing proceeds to step 5000 in FIG. 19. Since the following process is the same as that according to the first embodiment, the description thereof will not repeated.

Modified Examples

Although the second embodiment of the present invention has been described, the present invention is not limited to the described embodiment, and various modifications may be made. Hereinafter, such modified examples will be described. Forms to be described hereinafter may be appropriately combined.

Figure 20:
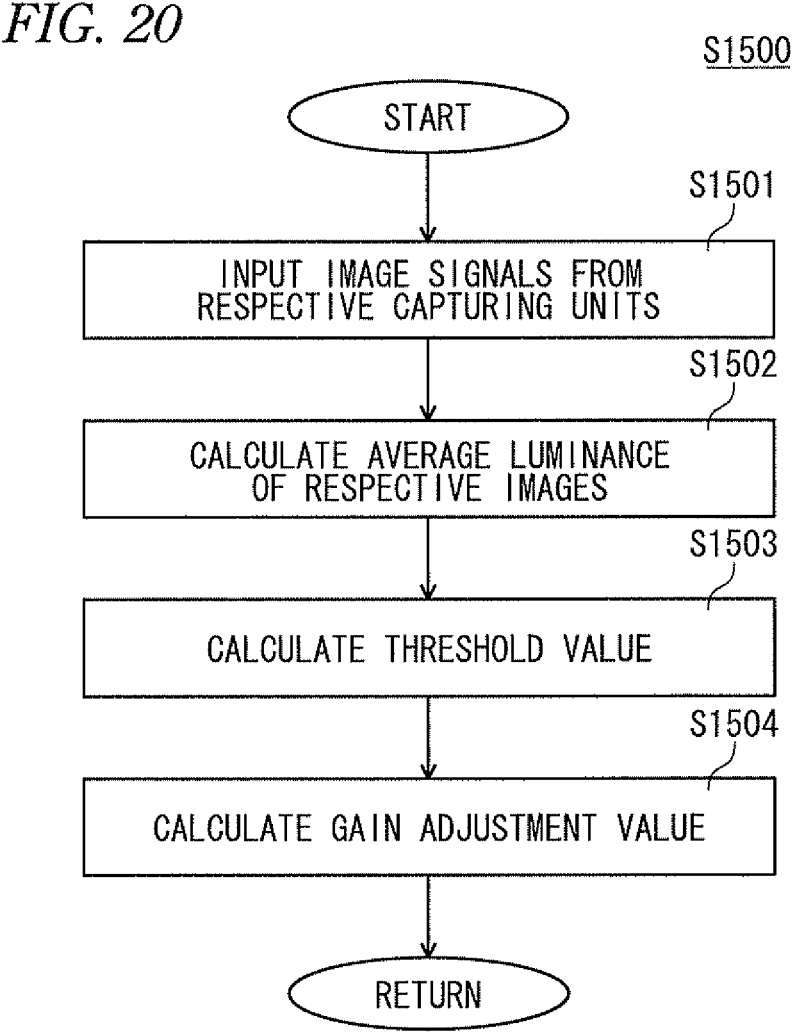
FIG. 20 is a flowchart illustrating the details of the image luminance calculation process in FIG. 19.

In step S1502 of FIG. 20, it is described that, for example, the average luminance calculation unit 120 determines whether or not the first average luminance for each region exceeds the threshold value in the regions 1 to 8 of the images Z1 to Z4 shown in FIG. 22, and if it is determined that the first average luminance of the region 3 and region 4 in the image Z1 as shown in FIG. 22 exceeds the threshold value, the average luminance calculation unit 120 determines the regions except for the region 3 and region 4 in the image Z1 and all regions in the images Z2 to Z4 as the target regions, and calculates the average luminances of the target regions. However, the average luminance calculation unit 120 may calculate the second average luminance for each of the images Z1 to Z4. Further, the threshold value calculated by the threshold value calculation unit 121 in step S1503 and the gain adjustment value calculated by the gain adjustment value calculation unit 122 in step S1504 may be calculated for each of the images Z1 to Z4. Further, even in the image luminance adjustment process S2500, the image luminance adjustment may be performed for each of the images Z1 to Z4.

Further, in the above-described embodiment, it is described that the threshold value derived on the basis of any image is applied to the processing of an image that is input just after the image. However, the image that applies the threshold value may not be the next image as long as the image is the image that is input after the image of which the threshold value has been derived.

In the above-described embodiments, it is described that various kinds of functions are realized by software through the arithmetic operation of the CPU according the program. However, a part of these functions may be realized by an electrical hardware circuit. By contrast, a part of the functions that are realized by the hardware circuit may be realized by software.

Further, although the respective processes in the flowchart diagrams illustrating the controls in the respective embodiments are shown in a series for convenience, respective control units may process the respective subdivided processes in parallel by a multitasking control function.

Priority is claimed on Japanese Patent Application No. 2010-017615 filed in the Japan Patent Office on Jan. 29, 2010 and Japanese Patent Application No. 2010-019060 filed in the Japan Patent Office on Jan. 29, 2012, the contents of which are incorporated herein by reference.

The invention claimed is:

1. An image processing device configured to be installed in a vehicle, comprising:
   an image acquirer configured to acquire camera images captured by cameras provided on the vehicle;
   an image selector configured to calculate, for each of the camera images, an average value of luminances of respective pixels constituting each of the camera images, and to select one of the camera images having a highest average value as a representative image;
   a first luminance adjuster configured to adjust a luminance of at least one of the other camera images based on a luminance of the representative image;
   a synthetic image generator configured to generate a synthetic image showing a periphery of the vehicle, based on the representative image and the other camera images the luminance of at least one of which has been adjusted by the first adjuster; and
   an image provider configured to output, to a display device installed in the vehicle, information corresponding to the synthetic image.

2. The image processing device according to claim 1, wherein:
   the image selector is configured to exclude the pixels having a luminance no less than a prescribed value when the average value is calculated.

3. The image processing device according to claim 2, further comprising:
   a controller configured to activate the first luminance adjuster when a difference between the highest average value and a lowest average value which are calculated by the image selector is no less than a prescribed value.

4. The image processing device according to claim 3, further comprising:
   a second luminance adjuster configured to adjust a luminance of each of the camera images based on the average value thereof calculated by the image selector, wherein:
   the controller is configured to activate the second luminance adjuster when the difference is less than the prescribed value.

5. An image processing method, comprising:
   acquiring camera images captured by cameras provided on a vehicle;
   calculating, for each of the camera images, an average value of luminances of respective pixels constituting each of the camera images;
   selecting one of the camera images having a highest average value as a representative image;
   adjusting a luminance of at least one of the other camera images based on a luminance of the representative image;

generating a synthetic image showing a periphery of the vehicle, based on the representative image and the other camera images the luminance of at least one of which has been adjusted; and outputting, to a display device installed in the vehicle, information corresponding to the synthetic image.

6. An image processing device configured to be installed in a vehicle, comprising:

an image acquirer configured to acquire a camera image captured by a camera provided on the vehicle;

a first average calculator configured to divide the camera image into a plurality of regions each of which includes a plurality of pixels, and to calculate, for each of the regions, an average value of luminances of the respective pixels as a first average value;

a region selector configured to select at least one of the regions in which the first average value is no greater than a threshold value;

a luminance adjuster configured to adjust an entire luminance of the camera image based on the luminance of the at least one of the regions selected by the region selector;

an image provider configured to output, to a display device installed in the vehicle, information corresponding to the camera image the entire luminance of which has been adjusted by the luminance adjuster;

a second average calculator configured to calculate an average value of luminances of the pixels included in the at least one of the regions selected by the region selector, as a second average value; and a threshold updater configured to update the threshold value based on the second average value.

7. The image processing device according to claim 6, wherein:

the luminance adjuster is configured to adjust the entire luminance of the camera image based on the second average value.

8. The image processing device according to claim 6, wherein:

the luminance adjuster is configured to adjust the entire luminance of the camera image based on a highest value of the luminances of the pixels included in the at least one of the regions selected by the region selector.

9. The image processing device according to claim 6, wherein:

the image acquirer configured to acquire camera images captured by cameras provided on the vehicle;

the first average calculator is configured to calculate the first average value for each of the camera images;

the region selector is configured to select the at least one of the regions for each of the camera images;

the luminance adjuster is configured to adjust the entire luminance for each of the camera images; and the image processing device further comprises a synthetic image generator configured to generate a synthetic image showing a periphery of the vehicle based on the camera images the entire luminances of which have been adjusted by the luminance adjuster; and the image provider is configured to output information corresponding to the synthetic image to the display device.

10. An image processing method, comprising:

acquiring a camera image captured by a camera provided on the vehicle;

dividing the camera image into a plurality of regions each of which includes a plurality of pixels;

calculating, for each of the regions, an average value of luminances of the respective pixels as a first average value;

selecting at least one of the regions in which the first average value is no greater than a threshold value;

adjusting entire luminance of the camera image based on the luminance of the at least one of the regions selected;

outputting, to a display device installed in the vehicle, information corresponding to the camera image the entire luminance of which has been adjusted;

calculating an average value of luminances of pixels included in the at least one of the regions selected; and updating the threshold value based on the second average value.

* * * * *